US008065362B2

(12) United States Patent
Greven et al.

(10) Patent No.: US 8,065,362 B2
(45) Date of Patent: Nov. 22, 2011

(54) SYSTEM AND METHOD FOR PROCESSING AND UPDATING EVENT RELATED INFORMATION USING AUTOMATED REMINDERS

(75) Inventors: Jeremy Greven, Toronto (CA); Blair Taylor, Sharon (CA)

(73) Assignee: promptALERT Inc., Toronto, Ontario (CA)

( * ) Notice: Subject to any disclaimer, the term of this patent is extended or adjusted under 35 U.S.C. 154(b) by 0 days.

(21) Appl. No.: 12/530,162

(22) PCT Filed: Mar. 8, 2007

(86) PCT No.: PCT/CA2007/000374
§ 371 (c)(1),
(2), (4) Date: Feb. 2, 2010

(87) PCT Pub. No.: WO2008/106762
PCT Pub. Date: Sep. 12, 2008

(65) Prior Publication Data
US 2010/0153487 A1   Jun. 17, 2010

(51) Int. Cl.
*G06F 15/16* (2006.01)
*G06Q 10/00* (2006.01)
(52) U.S. Cl. ........... 709/203; 709/204; 705/8; 705/7.13; 705/7.18; 705/7.19; 725/58
(58) Field of Classification Search .................. 709/203, 709/204; 705/8, 7.13, 7.18, 7.19; 725/58
See application file for complete search history.

(56) References Cited

U.S. PATENT DOCUMENTS

| | | | |
|---|---|---|---|
| 6,094,681 A * | 7/2000 | Shaffer et al. ................. 709/224 |
| 6,574,630 B1 * | 6/2003 | Augustine et al. ..................... 1/1 |
| 6,680,999 B1 * | 1/2004 | Garcia ........................ 379/88.22 |
| 6,823,357 B1 * | 11/2004 | Du et al. ......................... 709/203 |
| 6,965,917 B1 * | 11/2005 | Aloni et al. ..................... 709/206 |
| 7,472,181 B2 * | 12/2008 | Hollinger et al. .............. 709/224 |
| 7,668,863 B2 * | 2/2010 | Kalmick et al. .................... 705/5 |
| 2002/0156672 A1 * | 10/2002 | Burko ................................ 705/9 |
| 2003/0182391 A1 * | 9/2003 | Leber et al. .................... 709/217 |
| 2004/0098421 A1 * | 5/2004 | Peng ............................... 707/203 |
| 2004/0162642 A1 * | 8/2004 | Gasper et al. ................. 700/286 |
| 2004/0243547 A1 * | 12/2004 | Chhatrapati et al. .............. 707/2 |
| 2004/0267585 A1 * | 12/2004 | Anderson et al. .................. 705/8 |
| 2005/0076037 A1 * | 4/2005 | Shen ............................. 707/100 |
| 2005/0096095 A1 | 5/2005 | Benco et al. |
| 2005/0105396 A1 * | 5/2005 | Schybergson .................. 368/12 |
| 2006/0010023 A1 * | 1/2006 | Tromczynski et al. ........... 705/8 |
| 2006/0074758 A1 * | 4/2006 | Yeh et al. ........................ 705/14 |

(Continued)

*Primary Examiner* — Alina N. Boutah
(74) *Attorney, Agent, or Firm* — Haynes and Boone, LLP

(57) ABSTRACT

There is provided a system for facilitating updating of stored event data of a scheduling device, the event data adaptable for use in generating an event reminder message for receipt by a client resulting in corresponding response data in response to the event reminder message, the system comprising: an upload module configured for receiving a data package including the event data and at least one of a client data and service provider data associated therewith; a filter module configured for removing unnecessary data from the data package in accordance with predetermined filter settings to provide a modified data package; a communication module for configuring the modified data package for transmission to a server for use in generating the event reminder message; and a download module configured for receiving a notification package including the response data translated into a native language format of the scheduling device suitable for updating the stored event data, wherein the notification package is subsequently sent to the scheduling device for updating of the corresponding event data.

25 Claims, 8 Drawing Sheets

U.S. PATENT DOCUMENTS

| | | | |
|---|---|---|---|
| 2007/0061712 A1* | 3/2007 | Bodin et al. | 715/523 |
| 2007/0112602 A1* | 5/2007 | Bellon et al. | 705/3 |
| 2007/0160067 A1* | 7/2007 | Hayward | 370/397 |
| 2007/0198698 A1* | 8/2007 | Boyd et al. | 709/224 |
| 2008/0040188 A1* | 2/2008 | Klausmeier | 705/9 |
| 2008/0148320 A1* | 6/2008 | Howcroft | 725/61 |
| 2008/0161027 A1* | 7/2008 | Benco et al. | 455/466 |
| 2009/0030982 A1* | 1/2009 | Spivack et al. | 709/204 |
| 2009/0172773 A1* | 7/2009 | Moore | 726/1 |
| 2010/0217644 A1* | 8/2010 | Lyle et al. | 705/8 |

* cited by examiner

Notification Package 504

- Appointment data in native language
- Client data in native language
- Service provider data in native language
- Notification Results (Confirmed, No response, Cancelled, Request for reschedule, unable to contact client,....) in native language

Figure 5

SYSTEM AND METHOD FOR PROCESSING AND UPDATING EVENT RELATED INFORMATION USING AUTOMATED REMINDERS

CROSS-REFERENCE TO RELATED APPLICATION

This is a national stage of PCT/CA2007/000374, filed Mar. 8, 2007, the contents of which is hereby incorporated herein in its entirety by express reference thereto.

FIELD OF THE INVENTION

The present invention relates generally to a system and method for processing and updating event related information and specifically to using automated reminders for updating the event related information.

BACKGROUND OF THE INVENTION

With over 700,000 physicians conducting business in the U.S. alone, the market is ever expanding. The adoption of Electronic Medical Records (EMR) is growing every day as physicians new and old begin to realize the potential cost savings capable by adopting electronic management tools. In conjunction with the cost savings, EMR systems also allow healthcare providers to maintain centralized patient care records which are accessible in real-time from disparate sites. The standardization of information flow between healthcare providers is causing Federal governments to mandate the adoption of EMR systems. Physicians are increasingly starting to understand the benefits of electronic systems, and are looking for additional ways to leverage their investment.

A challenge faced for health care systems is patients are very busy people and the traditional 9-5 office hours are no longer sufficient to effectively service a 'round-the-clock' population. The healthcare industry is on the verge of a technological revolution. The declining cost of technology and its increasing ability to further healthcare is creating a lucrative niche market for companies with the foresight to assist. Research has shown that 35% to 45% of patients in the U.S. fail to attend scheduled physician appointments. Even using modest figures, the ability to decrease this 'no-show' rate is a niche 99 billion dollar industry in the United States alone. Traditional methods to address the problem are labor intensive, consuming the valuable resources of a physician's busy practice.

It is further noted that these challenges while discussed in relation to the healthcare industry, are also commonly faced within other industries such as education, financial services, legal services, insurance, and business services where there is a need for databases containing event and task related information (i.e. appointments and meetings with clients) which need to be maintained, updated and/or confirmed.

Problems associated with current state of the art appointment reminder systems include handling of large amounts of data from an appointment database having a plurality of appointments, client, and service provider information. A further problem is inefficiencies and errors in manual updating of appointment reminder status. A further problem is integration difficulties with a variety of appointment reminder systems for effective updating of their appointment records. A further problem concerns monitoring and efficient processing of related appointments. A further problem concerns coordination (i.e. disconnect or misunderstanding) of appointment details between service providers, clients, and the appointment reminder systems.

One solution to address this challenge is performed by Televox™, however their appointment reminder solution does not provide real-time two-way integration into the appointment database.

SUMMARY OF THE INVENTION

Accordingly, there is a need for a method and system to process event related information and to update the event information in the scheduling device's database using automatically generated reminders such as to obviate or mitigates at least some of the above-presented disadvantages.

In accordance with an aspect of the present invention there is provided a system for facilitating updating of stored event data of a scheduling device, the event data adaptable for use in generating an event reminder message for receipt by a client resulting in corresponding response data in response to the event reminder message, the system comprising: an upload module configured for receiving a data package including the event data and at least one of a client data and service provider data associated therewith; a filter module for removing unnecessary data from the data package in accordance with predetermined filter settings to provide a modified data package; a communication module configured for transmitting the modified data package to a server for use in generating the event reminder message; and a download module for receiving a notification package including the response data translated into a native language format of the scheduling device suitable for updating the stored event data, wherein the notification package is subsequently sent to the scheduling device for updating of the corresponding event data.

In accordance with an aspect of the present invention there is provided a system for tracking and updating event data received from a scheduling device, the system comprising: a bridge configured to receive a data package comprising the event data and at least one of a client data and service provider data associated therewith, the bridge further configured for removing stale data from the data package in accordance with predetermined filter settings; and a server configured to receive the filtered data package forwarded from the bridge and to generate reminders for the client associated with the data package, the server further configured to forward a notification package having a notification response from the client to the bridge; wherein the bridge is further configured to cooperate with the scheduling device to apply the notification response thereon.

In accordance with an aspect of the present invention there is provided a method for facilitating updating of stored event data of a scheduling device, the event data adaptable for use in generating an event reminder message for receipt by a client resulting in corresponding response data in response to the event reminder message, the method comprising: receiving a data package including the event data and at least one of a client data and service provider data associated therewith; removing unnecessary data from the data package in accordance with predetermined filter settings to provide a modified data package; transmitting the modified data package to a server for use in generating the event reminder message; and receiving a notification package including the response data translated into a native language format of the scheduling device suitable for updating the stored event data, wherein the notification package is subsequently sent to the scheduling device for updating of the corresponding event data.

A further aspect provided is a system for facilitating updating of stored event data of a scheduling device, the event data adaptable for use in generating an event reminder message for receipt by a client resulting in corresponding response data in response to the event reminder message, the system comprising: an upload module configured for receiving a data package including the event data and at least one of a client data and service provider data associated therewith; a communication module for configuring the data package for transmission to a server for use in generating the event reminder message; and a download module configured for receiving a notification package including the response data translated into a native language format and for updating the stored event data in a database associated with the scheduling device.

BRIEF DESCRIPTION OF THE DRAWINGS

An embodiment of the invention will now be described by way of example only with reference to the following drawings in which:

FIG. 5 is a block diagram illustrating example components of a notification package used in the system of FIG. 1;

DETAILED DESCRIPTION OF THE PREFERRED EMBODIMENT

Figure 1:
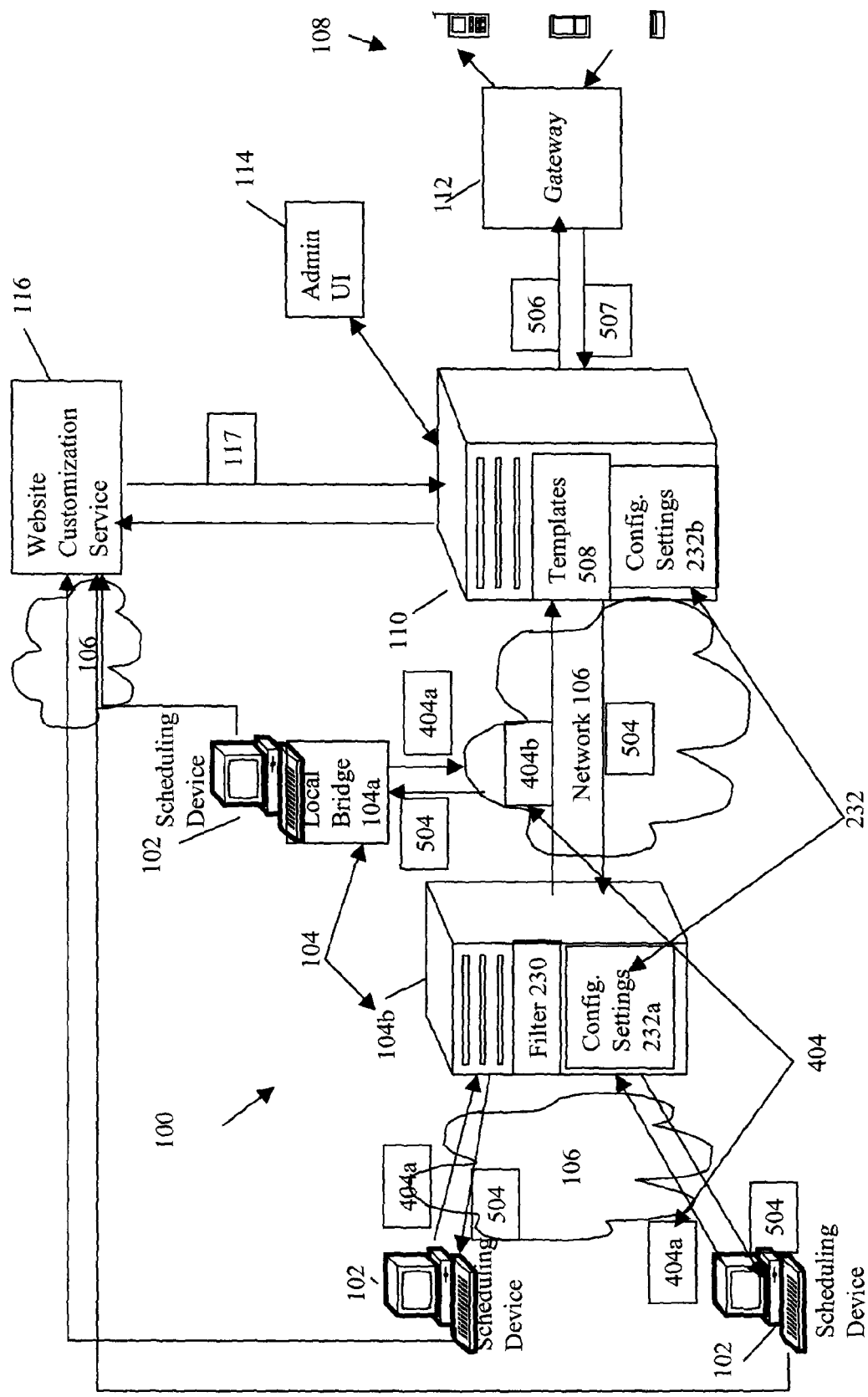
FIG. 1 is a block diagram illustrating an information processing system for processing and updating appointment information.

For convenience, like reference numerals in the description refer to like structures in the drawings. Referring to FIG. 1, shown is an information processing system 100 for processing and updating event related information. The system 100 provides upload of event related information (including one or more appointments, as well as corresponding clients and service providers associated therewith) stored on a scheduling device 102 via a data package 404 transmitted across a network 106. The system 100 generates and transmits notifications to the clients for the upcoming events in data package 404 via notification reminders 506 and receives responses, such as confirmations from the client to the particular event in the notifications via notification responses 507. The system 100 translates the responses 507 into a notification package 504 which is in the form for applying the update on the corresponding scheduling device 102 and its associated database. Examples of users of the scheduling devices 102 include doctors, dentists, lawyers and other entities needing sophisticated appointment scheduling services.

As described, the system 100 is used for processing and updating event related information. Events refer to various types of occurrence, happenings or activity that may be related to one or more persons. That is, events can refer to any actions scheduled for a certain time and/or date and/or place. Examples of events include appointments, meetings, scheduled tasks, or other activities. For simplicity, the term appointments will be used hereinafter to refer to one type of exemplary event. However, it will be understood that other types of events may be envisaged.

As shown in FIG. 1, the system 100 comprises one or more scheduling devices 102 connected via the bridge 104 through to a network 106 to a notification server 110. The bridge 104 may exist as a standalone unit such as the bridge proxy server 104b or it may be implemented as an application loaded onto a corresponding scheduling device 102. For convenience, the bridge 104 whether implemented as a standalone unit 104b or installed on the scheduling device 102 as a local bridge 104a will be referred to as the bridge 104 hereinafter. As will be described further below, the bridge 104 is configured for intelligent manipulation of the data package 404 in order to help reduce the bandwidth sent across the network 106 by minimizing the size of the data package 404 and to thereby facilitate improvements in the efficiency of the system 100. For example, the bridge 104 further comprises a filter module 230 to implement bridge 104 intelligence to reduce the amount of data included in the data package 404a prior to transmission over the network 106 to the server 110 as data package 404b. In one case, during the upload process which transmits data from the scheduling device 102 across the network 106 to the server 110, the filter module 230 is configured to remove stale appointment related data, repetitive data or unchanged data (as compared to previous transmission(s) of the data package 404a,b) prior to sending the data package 404b across the network 106. In one case, the filter module 230 is configured to remove client data or service provider data not linked to appointment data. Additionally, the bridge 104 comprises a number of configuration settings 232a, which control the operation of the bridge 104 with respect to the central server 110 connected to the bridge 104, and the one or more scheduling devices 102. For example, the configuration settings 232a may define the time intervals for uploading the data package 404 to the server 110. Additionally, as will be described, the bridge 104 processes the notification package 504 received in response to the data package 404 and applies the notification results provided by the notification package 504 to the database 210 of the corresponding scheduling device 102 which originated the data package 404. As will be described, the bridge 104 acts an interface between the scheduler application/scheduler database 210 and the central server 110, for facilitating intelligent upload and download of the packages 404, 504.

Referring again to FIG. 1, the central server 110 is further connected to the network 106 for receiving appointment related data via the data package 404 from the one or more scheduling devices 102 through the bridge 104. As will be described, the central server 110 is configured to process the appointment related data received from the bridge 104 and to generate automated notification reminders 506 for the appointments in the data package 404. In turn, a Gateway 112 (i.e. a voice or SMS and/or SMTP Gateway) is coupled to the central server 110 for processing the automated notification reminders 506 and directing the automated notification reminders 506 to a corresponding client's device 108. The client devices 108 may include, for example, a telephone device, a pager, a printer, an SMS client device, a personal computer, a personal digital assistant, a laptop or other devices configured to receive voice, text and/or email notification reminders 506 for a response to be fed back via the server 110 and bridge 104 to update the scheduling device's 102 database 210 (see FIG. 2) containing the appointment data.

Additionally, as shown in FIG. 1, the system 100 further comprises a website customization service 116 and an admin user interface 114 connected to the central server 110. The automated notification reminders 506 described herein may be generated using predefined templates 508 stored on the server 110. Alternatively, the templates 508 used to generate the automated notification reminders 506 can be customized using the website customization service 116 (via the website update package 117) and/or the admin user interface 114 which allow customization of the generated notification reminders 506 for the appointment related data as will be transmitted to the client devices 108. It will be understood that the information processing system 100 may include additional servers, scheduling devices, and other devices not shown, including one or more distributed servers 110 and bridge proxy server 104b.

Each of the main components of the system 100 will now be discussed with reference to FIGS. 1, 2, 3, 4 and 5, namely the scheduling device 102, the data package 404, the bridge 104, the appointment server 110, and the notification package 504.

Scheduling Devices 102

Figure 2:
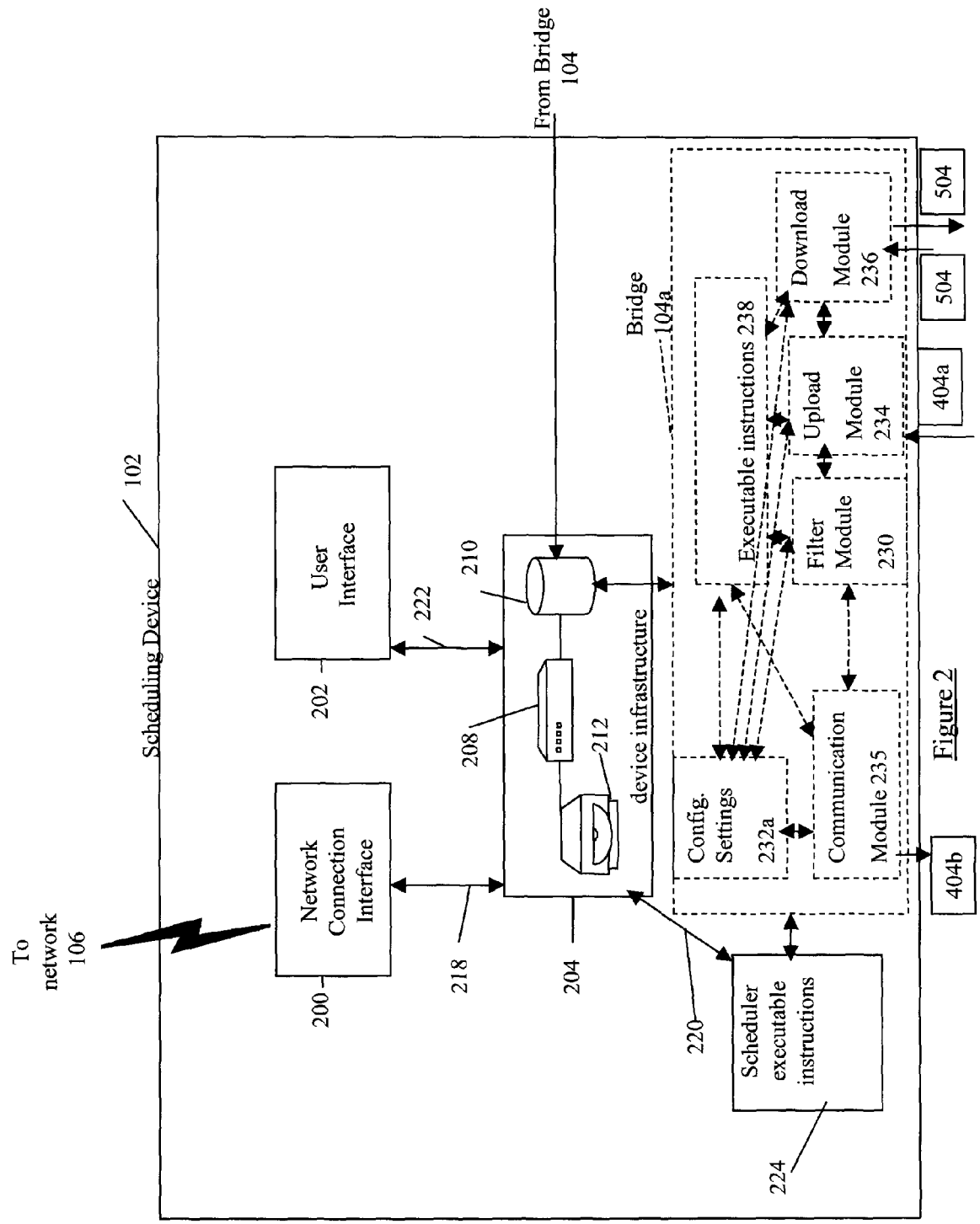
FIG. 2 is a block diagram of a scheduling device of FIG. 1.

Referring to FIGS. 1 and 2, each of the scheduling devices 102 includes at least one database or memory storage (i.e. database 210) for storing the data package 404 comprising the appointment data 406, client data 410 and service provider data 408. For example, appointment data 406 may include the time of the appointment, the date of the appointment, the location of the appointment and other details regarding the appointment. The client data 410 may include, for example, names of clients/patients having appointments, the date of birth of the client, client contact information, names of other family members linked to the client, client billing details (i.e. for patient record keeping) and other identification information for the client. The service provider data 408 may include, for example, the name of a doctor, dentist, or lawyer or other type of service provider which a client may have an appointment with. The service provider data 408 then includes identification information for the various service providers. It should be noted that one scheduling device 102 may be associated with various service providers, each having their own clients and appointments. In turn each of these appointments is stored in database 210.

These scheduling devices 102 provide an interface for a service provider or an administrator to input and update data 410, 406, 408 relating to a client "Cn" and the client's associated appointments "An" for a particular service provider "Sn", details of which are communicated to the client devices 108 as further described below. The data package 404 contained within the scheduling device's database 210 can be further updated to include the results of the notification package 504. For example, where the scheduling device 102 stores a list of appointment "An" data 406 for a client "Cn", then the appointment data 406 may be updated to include information about whether the client "Cn" has confirmed the relevant appointment "An".

The scheduling devices 102 discussed herein, for example, are personal computers or network computers that are implemented as clients to the central server 110. Referring to FIG. 2 shown is a block diagram of a computer system configured as the scheduling device 102. As shown in this figure, the scheduling device 102 can generally include a network connection interface 200, such as a network interface card or a modem, coupled via connection 218 to a device infrastructure 204. The connection interface 200 is connectable during operation of the scheduling device 102 to the network 106 (e.g. an intranet and/or an extranet such as the Internet), which enables each of the scheduling devices 102 to communicate with each the server 110 as appropriate. The network 106 supports the communication of the package data 404 between the bridge 104 and the scheduling devices 102 or between the bridge 104 and the server 110. As discussed earlier, the bridge 104 acts as an interface between the scheduling device 102 and the server 110. Further, the network 106 supports the transmission of the notification package 504 between the server 110 and the bridge 104 as well the communication between each of the scheduling devices 106 and the website customization service 116 as desired.

Referring again to FIG. 2, each of the scheduling devices 102 can also have a user interface 202, coupled to the device infrastructure 204 by connection 222, to interact with a user such as the service provider or the scheduling device's 102 administrator (not shown). The user interface 202 can include one or more user input devices such as but not limited to a QWERTY keyboard, a keypad, a track wheel, a stylus, a mouse, a microphone and the user output device such as an LCD screen display and/or a speaker. If the screen is touch sensitive, then the display can also be used as the user input device as controlled by the device infrastructure 204. For example, the user interface 202 for the scheduling device 102 is employed by the user of the scheduling device 102 to input data relating to the service provider data 408, the client data 410, and the appointment data 406.

Referring again to FIG. 2, the operation of the scheduling device 102 is facilitated by the device infrastructure 204. The device infrastructure 204 includes one or more computer processors 208 and can include an associated memory 210 (e.g. a random access memory). The computer processor 208 facilitates performance of the scheduling device 102 configured for the intended task through operation of the network interface 200, the user interface 202 and other application programs/hardware of the scheduling device 102 by executing task related instructions. These task related instructions can be provided by an operating system, and/or software applications located in the memory 210, and/or by operability that is configured into the electronic/digital circuitry of the processor(s) 208 designed to perform the specific task(s). Further, it is recognized that the device infrastructure 204 can include a computer readable storage medium 212 coupled to the processor 208 for providing instructions to the processor 208 and/or to load/update client application programs 224, 104a. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Further, it is recognized that the scheduling devices 102 can include the executable application programs/instructions such as the scheduler instructions 224 (i.e. exemplary software scheduling programs allow users to store and access information relating to the users, their scheduled events/tasks, and corresponding contact information). It is further noted that in some cases, these software scheduling programs facilitate sharing of calendar events among users to allow scheduling within a global calendar of events. As further illustrated in FIG. 2, the scheduling devices 102 can also include bridge application program 104a comprising code or machine readable instructions for implementing predetermined functions/operations including those of an operating system, healthcare provider or service provider information system or other information processing system, for example, in response to command or input provided by a user of the scheduling device 102 or the system 100. The processor 208 as used herein is a configured device and/or set of machine-readable instructions for performing operations as described by example above.

As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality provided by the systems and process of FIGS. 1,2,3 may be implemented in hardware, software or a combination of both. Accordingly, the use of a processor 208 as a device and/or as a set of machine readable instructions is hereafter referred to generically as a processor/module for sake of simplicity.

Accordingly, the scheduling device 102 provides access to the data 404 (received in database 210) to the bridge 104 as well as receives updates to data 404 in storage/database 210 in the form of a notification package 504 configured for application to the storage/database 210.

It will be understood by a person skilled in the art that the storage/database 210 described herein is the place where data is held in an electromagnetic or optical form for access by a computer processor. There are two general usages: First, storage is frequently used to mean the devices and data connected to the computer through input/output operations such as hard disk and tape systems and other forms of storage not including computer memory and other in-computer storage. Second, in a more formal usage, storage has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage is much faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of storage 210 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory is a further embodiment of storage/database 210 as the electronic holding place for instructions and data that the computer's microprocessor can reach quickly. When your computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in your computer.

The Data Package 404

Figure 4:
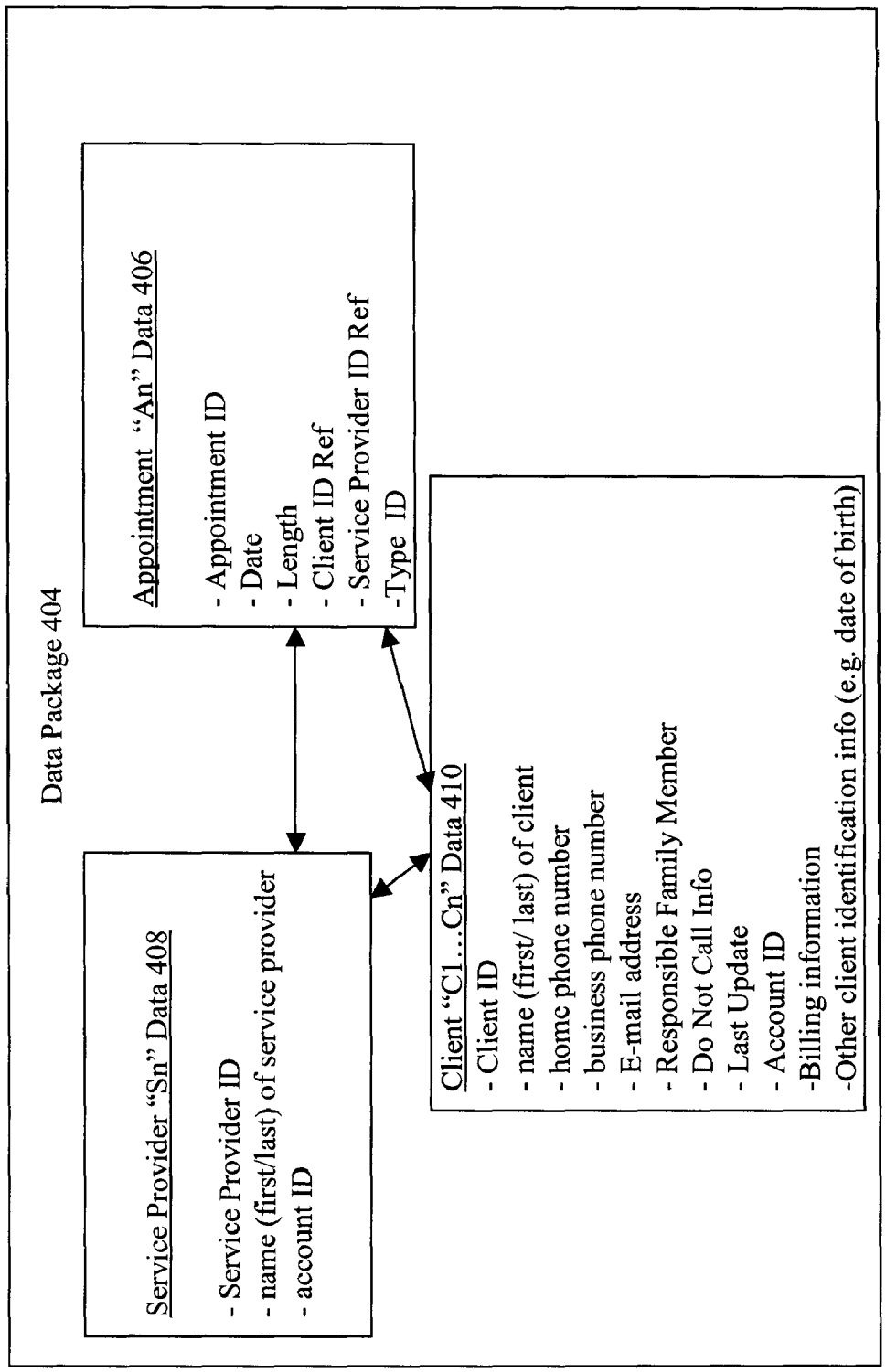
FIG. 4 is a block diagram illustrating example components of a data package used in the system of FIG. 1.

Referring to FIGS. 1 and 4, the data package 404 discussed herein is a combination of service provider data 408, client data 410 and appointment data 406 for a particular client "Cn" and service provider "Sn". For example, said service provider "Sn" (i.e. a particular dentist) can use a scheduling device's 102 database 210 for storing thereon said dentist's list of clients "Cn" and appointments for each of those clients. Additionally, as shown in FIG. 4, each service provider such as a dentist, physician, health care provider or other defined service provider is defined by certain identification means such as but not limited to, a name of the service provider, an account ID, and a service provider ID. In turn, each client associated with the service provider (i.e. a dental patient) has identifying characteristics such as but not limited to, the client's name, ID, and contact information. Further, each appointment "An" corresponds to a scheduled event for a particular client "Cn" by the service provider "Sn". Thus, the appointment data 410 can include such as but not limited to an appointment ID, a date and time for the appointment, the associated client ID, and the associated service provider ID.

It will be understood that the components of the data package 404 shown in FIG. 4 are exemplary and other combinations of sub-information relating to and included as a part of each of the service provider data 408, appointment data 406 and client data 410 may be envisaged. As shown in FIG. 1, for simplicity, the data package 404 discussed herein refers generally to either one or both of the data packages 404a, and 404b. Since, as will be described, the data package 404 contents can be modified at each stage by the scheduling devices 102, the bridge 104 and the server 110. Thus, each of the data packages 404a and 404b can include all or a subset of the data described generally as data package 404 shown in FIG. 4. Further examples of fields that may be included in each of the service provider data 408, the appointment data 406 and the client data 410 for each data package 404 are provided below. Additionally, the data package 404a refers specifically to the data package 404 communicated between one of the scheduling devices 102 and a corresponding bridge 104 while the data package 404b refers specifically to a data package 404 which is communicated between the bridge 104 and the central server 110. For example, while the data package 404a sent to the bridge 104 can include all the phone numbers and an email address for a particular client "Cn", it may be determined by the bridge 104 intelligence (i.e. via the configuration settings 232) that the preferred mode of communication to the client is by the client's home telephone number and thus the bridge 104 may filter out (via filter 230) additional contact information such that the data package 404b includes only the relevant phone number as the contact information.

The data package 404 shown in FIG. 4 can be further understood with reference to the following exemplary descriptions of each of the service provider data 408, appointment data 406 and client data 410 and their corresponding fields. The description below provides an example of some of the fields that may included within the each of the data 406, 408, and 410 for a data package 404. It is noted that other additional fields defining each of the data 406, 408, and 410 may be envisaged as will be understood by a person of ordinary skill in the art.

It will further be understood by a person of ordinary skill in the art that the data packages 404a and 404b may be transmitted one segment at a time. For example, the bridge 104 may be configured to send the client data 410 first to the central server 110, followed by the service provider data 408 and the appointment data 406.

The client data 410 can include, for example, the following fields:

| Field Description |
| --- |
| A cross reference id to the client id used in the client package. |
| The client salutation. |
| The first name of the client. |
| The last name of the client. |
| The email address of the client. |
| The home phone number of the client. |
| The business phone number of the client |
| A flag indicating if this client is willing to receive reminder notifications. |
| A flag indicating if the client has signed a HIPPA agreement. |
| The account id (clinic) of the client. |
| A cross reference id to the client id used in the client package which represents the responsible family member for the client. This can be null and is usually used when the client is a child and the responsible family member is a parent. |
| The user updating this record. For the import, this is the admin user. |

The service provider data 408 can include, for example, the following fields:

| Field Description |
| --- |
| A cross reference id to the service provider id used in the client package. |
| The service provider salutation. |
| The first name of the service provider. |
| The last name of the service provider. |
| The account id (clinic) of the service provider. |
| The useR updating this record. For the import, this is the admin user. |

As will be described with reference to communications between the bridge 104 and the server 110 with respect to bridge intelligence, in one embodiment, once the service provider data 408 for a particular service provider "Sn" has been provided to the server 110, it is not transmitted again. In this case, the bridge 104 may send the service provider data 408 again only in order to add information about a new service provider not previously sent or to update information about the previously transmitted service provider "Sn".

Further, the appointment data 406 sent as part of data package 404 can include, for example, the following fields:

| Field Description |
| --- |
| A cross reference id to the appointment id used in the client package. |
| The appointment date and time. |
| The length of the appointment in minutes. |
| A cross reference id to the client id used in the client package. |
| The account id (clinic) of the service provider. |
| A cross reference id to the service provider id used in the client package. |
| The batch number of the appointment. This is used to determine if future appointments not sent within the latest batch of appointments should be deleted. |
| A flag (i.e. a DoNotCall flag) indicating if reminders should be generated for the appointment. |
| A type id for the appointment. This allows for future categorization of appointments. Current values include "normal" and "recall". |
| The user updating this record. For the import, this is the admin user. |

The contents of the data package 404 including the fields contained within each of the data 406, 408, and 410 may vary at each stage of the system 100. The transmission and manipulation of the data package 404 will be discussed further with reference to each of the bridge 104 and the server 110.

Bridge 104

As discussed earlier, and illustrated in FIGS. 1, 2, and 3 the bridge 104 may be implemented as a standalone unit such as the bridge proxy server 104b or alternatively, the bridge 104 may be implemented as an application program, such as bridge 104a loaded onto the corresponding scheduling device 102. As shown in FIG. 1, where the bridge 104 is implemented as a bridge proxy server 104a, then the scheduling devices 102 connected thereto do not include the bridge 104a application program. Conversely, where the bridge 104 is implemented as the bridge application program 104a on a scheduling device 102 having a series of executable instructions 238 installed on the scheduling device 102, then the scheduling device 102 and the local bridge 104a are connected directly to the server 110 via the network 106. It is recognized that executable instructions could be hard-coded (e.g. logic device), soft-coded (e.g. software), or a combination thereof.

Figure 3:
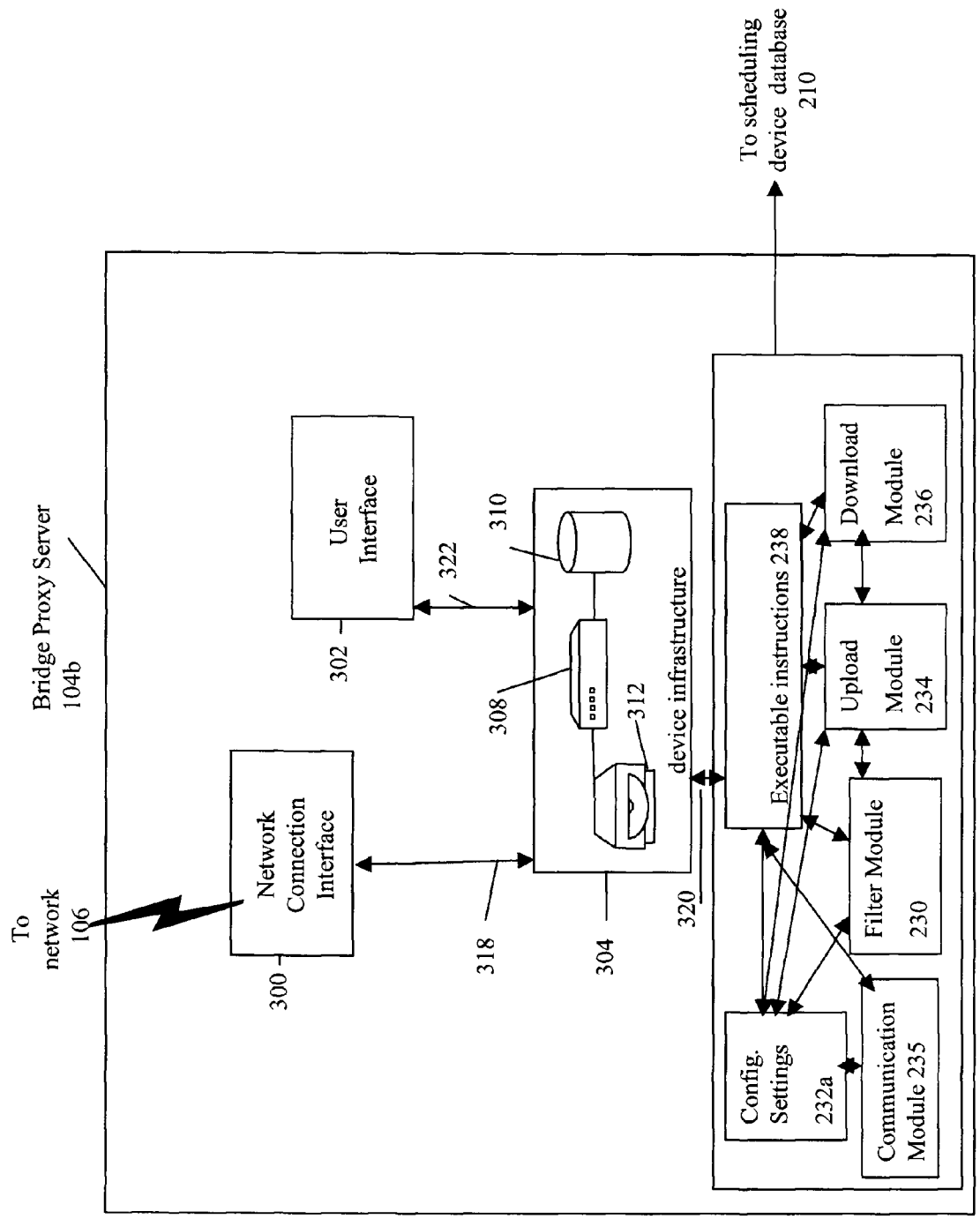
FIG. 3 is a block diagram of a bridge proxy server of FIG. 1.

As shown in FIGS. 2 and 3, the bridge 104 comprises a series of executable instructions 238, an upload module 234, a download module 236, the number of configuration settings 232a, and the filter module 230 discussed earlier. The upload module 234 of the bridge 104 has the capability to obtain the data package 404a including the appointment data 406 from the database 210 or other storage of the scheduling device 102. As will be discussed, the configuration settings 232a determine the communication protocol used by the upload module 234 and the download module 236 to communicate with the database 210 and the scheduling device 102. Additionally, the configuration settings 232a define the time intervals at which the communication between the bridge 104 the scheduling device 102 and the server 110 occurs.

According to one embodiment, the upload and download times occur at separate time instances. For example, the configuration settings 232a may define that the upload module 234 uploads the data package 404a at every 30 seconds while the download module 230 downloads data to the scheduling device 102 every 30 minutes. Alternatively, the upload module 234 may be configured to upload the data package 404a substantially simultaneously rather at set time intervals such that it is almost immediately aware of updates to the scheduling devices 102. Similarly, the download module 230 may be configured to download data to the scheduling device 102 substantially instantaneously.

As further described below, once the upload module 234 receives the data package 404a it communicates the data package 404a to the filter module 230 which is configured to filter the data package 404a contents according to the filter settings in order to generate the data package 404b (e.g. which includes client data 410, service provider data 408 and appointment data 406) across the network 106 to the server 110. The server 110 then uses the appointment data 406 within the data package 404b for generation of the notification reminders 506 to the client and then once the notification response 507 is received from the client, the server 110 translates the response data into native language for the scheduling device 102.

Further, the bridge's download module 236 is then configured to download the notification package 504 from the server 110 (according to the configuration settings 232). The download module 236 further communicates the notification package 504 including the response data back to the associated database 210 of the scheduling device 102, in order to update the stored data of the data package 404a. The notification package 504 is indicative of the appointment confirmation/response information received from the client devices 108 in response to the reminders 506. The operation of the bridge 104 is discussed in detail below.

Installation

In one embodiment, the bridge 104 installs (e.g. on the scheduling device 102) as a Microsoft Windows Installer package (MSI). The installation displays a license agreement page and allows the installer to select the directory to be installed. Once installed, the installer runs a script (installservice.cmd) included within the executable instructions 238 to register the service and create the event log source "PromptAlert" in the Windows event viewer. The script also sets the event viewer category to overwrite events as needed.

Configuration Settings 232a

Once the bridge 104 is installed, configuration settings 232a are defined to allow the bridge to operate as needed by the server 110. The configuration settings 232a define the operation of the upload module 234, the download module 236 and the communication between the bridge 104 and the connecting components such as the one or more scheduling devices 102 and the server 110. Additionally, the configuration settings 232a may include information about the database 210 for the corresponding scheduling device 102. As mentioned earlier, the database 210, stores the relevant service provider data 408, appointment data 406, and client data 410 as communicated from a scheduling application program/executable instructions 224. Thus, the configuration settings 232a may include information about the database 210 type, the connection protocol required for communication to the database 210 (as required for communication from the upload module 234 or the download module 236 to the database 210).

For example, the bridge 104 XML file, is located in the install directory specified during installation of the bridge 104 and provides default values for the configuration settings 232a. As will be described, the server 110 also includes a set of customizable configuration settings 232b stored thereon. The configuration settings 232b stored on the central server 110 are account specific such that they can be updated by a user of the website customization service 116 (i.e. a dentist, a service provider or an administrator of one or more scheduling devices 102). Alternatively, as shown in FIG. 1, the configuration settings 232b may be updated by the scheduling device 102 connected to the website customization service 116 via the network 106. In this case, the service provider may use a user interface 202 of the scheduling device 102 to modify the configuration settings 232b via the website customization service 116. Further alternatively, as shown in FIG. 1, the admin user interface 114 may be provided to allow direct modification of the configuration settings 232b on the server 110.

As will be described, the configuration settings 232b once defined for a particular account (i.e. service provider/scheduling device 102/database 210) and stored on the server 110, may be communicated to the bridge 104 for defining some of the values in the configuration settings 232a not previously defined and for overwriting certain generic default values. For simplicity, the configuration settings 232a, and 232b are referred to generally as configuration settings 232.

The following table provides examples of configuration settings 232 and what they represent such that may be used by the bridge 104:

| Configuration Settings 232 | Description |
| --- | --- |
| ProxyURL | This contains the URL for the web service which is needed for scheduling device 102/bridge 104 upload of appointment information. The web service may include the output interface of the bridge 104. |
| DatabaseName | This is used to determine the specific application package (i.e. the scheduler executable instructions 224). The handling of appointment datetime values are based on the application package since each application package (i.e. scheduler executable instructions 224) stores appointment date and appointment time differently. |
| DatabaseProvider | This contains information on the type of DB connection (i.e. database 210). It is used to determine the connection type. Current examples are "ODBC", and "OLEDB". |
| ProxyTimeout | This indicates the time in ms for which the web service/the bridge 104 should wait for a response from the server 110. |
| AppointmentSQL | This is the SQL definition for the query to return appointment data 406 to the server 110. |
| ServiceProviderSQL | This is the SQL definition for the query to service provider data 408 to the server 110. |
| ConfirmTransmissionSQL | SQL used to validate the transmission. |
| AccountId | This contains the account id for the account (clinic) in the server 110. |
| DatabaseConnectionString | This contains the connection string to use to connect to the scheduling device 102 database 210. |
| SecurityToken | This is the assigned security token. This token is assigned by server 110 and set during installation. This token along with SSL ensures that client data transmission is secure. |

-continued

| Configuration Settings 232 | Description |
| --- | --- |
| DoClientUpdate | This flag indicates whether server 110 should sent confirmation updates in the form of the notification package 504 back to the scheduling device 102 application package. For subsequent application of the confirmation updates on the database 210. |
| StartInterval | This is the value in hours to subtract from the current date to determine the beginning interval to send client appointment confirmations and activity back to the bridge 104. |
| EndInterval | This is the value in hours to add to the current date to determine the ending interval to send client appointment confirmations and activity back to the bridge 104. |
| ProxyURLClientUpdates | This is the URL for the webservice which allows the system 100 to send appointment confirmation and activity updates to the scheduling device 102 and its associated database 210. The client accesses this URL based on the value specified in the ClientDownloadIntervalInMinutes setting. |
| ServerUploadIntervalInMinutes | This is the interval in minutes in which the bridge application 104 will send appointment, client and service provider updates in the form of data 406,408, 410 to the server 110. As described, this upload interval may be a set time interval where the upload occurs in batches or it may be a "real-time" interval. For example, the real-time interval may be in milliseconds such that new data contained in the data 406, 408, 410 is uploaded substantially simultaneously. |
| ClientDownloadIntervalInMinutes | This is the interval in minutes in which the bridge application 104 will download appointment confirmation and activity from the server 110. This download interval may be a set time interval where the download occurs in batches or it may be a "real-time" interval. For example, the real-time interval may be in milliseconds such that the reminder information is obtained from the server 110 substantially simultaneously. |

Additionally, the handling of appointment datetime values are based on the scheduler instructions/application package 224 since each scheduler application package 224 stores appointment date and time differently.

Upload Module 234

Referring again to FIGS. 2 and 3, the bridge 104 comprises the upload module 234. The upload module 234 is responsible for receiving the data package 404*a* containing the service provider data 408, the client data 410, and the appointment data 406 from the scheduling device 102 and for transmitting a filtered version of the data package 404*a* (i.e. in the form of data package 404*b*) to the server 110. The filtering of data is facilitated by the filter module 230 provided by the bridge 104. Additionally, the operation of the upload module 234 with respect to the scheduling device 102 and the server 110 is defined by the configuration settings 232 described above.

Figure 6:
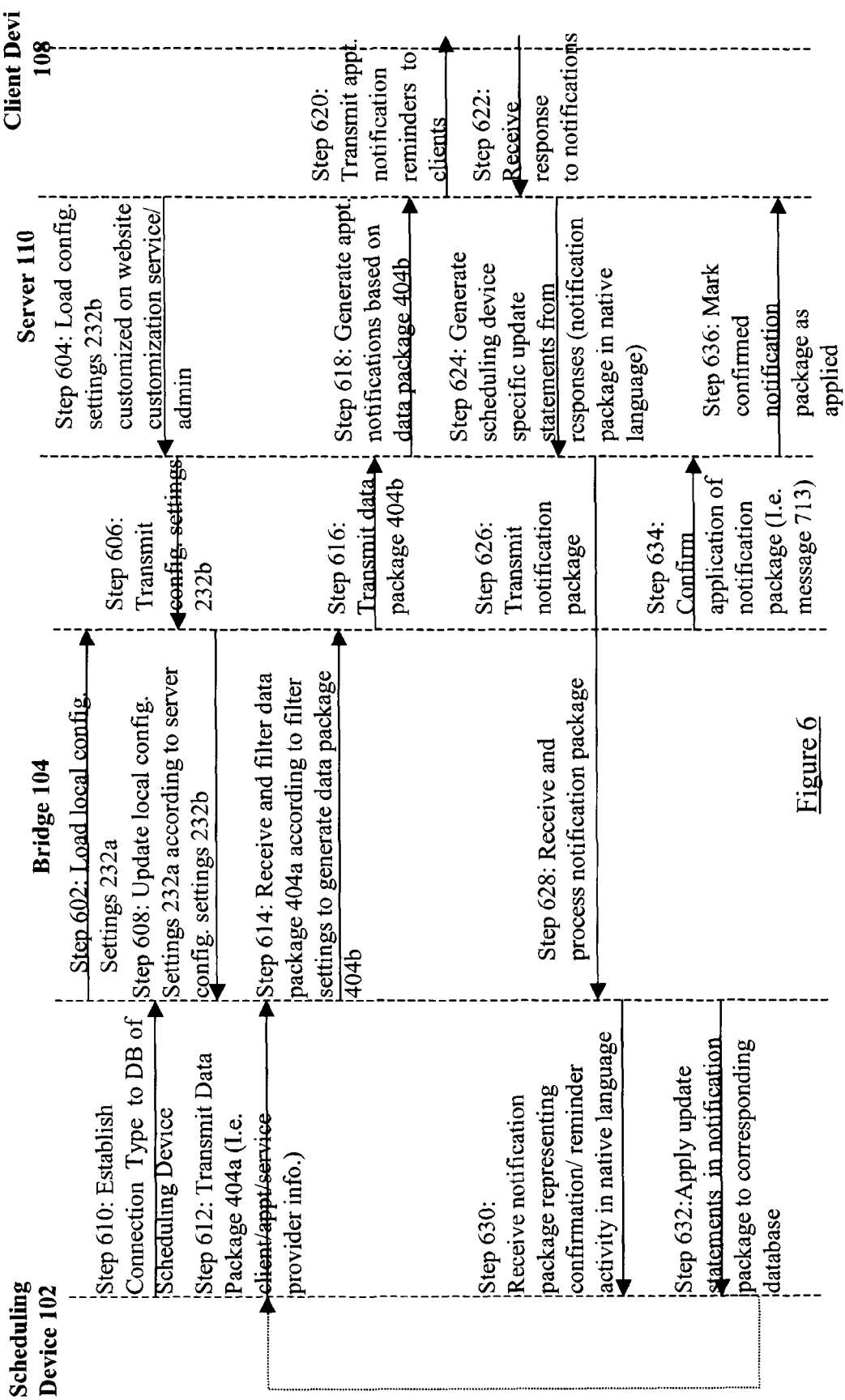
FIG. 6 is a sequence diagram illustrating an example communication between the bridge and one of the scheduling devices of FIG. 1.

Referring to FIG. 6, shown is the operation of the system 100 as defined by its components. As shown in FIG. 6, at step 602 the upload module 234 of the bridge 104 first loads in the local configuration settings 232*a* defined during installation of the bridge 104. At the same time, the server 110 has loaded thereon a number of customizable configuration settings 232*b* which may have been customized through the website customization service 116 (via the updates 117) or through an admin user interface 114. At step 606, the configuration settings 232*b* are transmitted to the bridge 104. For example, this may be facilitated via a web service call to the server 110. As described earlier, this allows for configuration changes for the service provider account to be made on the server 110 and to propagate to the bridge 104. At step 608, the server defined configuration settings 232*b* are then loaded onto the bridge 104 and override the local configuration settings 232*a*.

In one embodiment, the upload module 234 then replaces the token date in the AppointmentSQL with the last transmission date for the bridge 104. The last transmission date is used to store the date of the last successful transmission to the server 110. This information which is stored in the configuration settings 232 allow the upload module 234 to determine which appointment data 406 to upload to the server 110 such that the appointment data 406 uploaded is current.

For example, the tokens replaced are:

| Token | Value |
| --- | --- |
| YYYY | Year |
| MM | Month |
| ZZ | Day |
| HH | Hour |
| MM | Minute |

At step 610, the upload module 234 then uses the DatabaseProvider setting stored in the configuration settings 232 to determine if the client is using OLEDB, ODBC, or another database connection. Based on this value, the upload module 234 applies an SQL query against the database 210 via the scheduler 224 to determine a list of appointment data 406, service provider data 408 and client data 410 to receive from the scheduling device 102. Alternatively at step 612, the scheduling device 102 transmits the data package 404*a* containing client data 410, appointment data 406 and service provider data 408 to the bridge 104. At step 614, the upload module 234 receives the data package 404*a* and filters the data package 404*a* according to the filter module 230 settings in order to generate the data package 404*b* for subsequent transmission to the server 110 at step 616. As defined by the configuration settings 232, the frequency of upload of the data package 404*b* to the server 110 is determined by the value stored in the ServerUploadIntervalInMinutes. For example, the upload module 234 may upload data package 404b to the server 110 at predefined intervals. Alternatively, the upload module 234 may be configured to transmit data package 404a each time there is new information relating to appointment data 406/client data 410/service provider data 408 stored on the database 210. Thus when an update is made on the data package 404 using the scheduling device 102, the update may be transmitted substantially simultaneously to the server 110. For example, this may be implemented by configuring the "ServerUploadIntervalInMinutes" to real-time such that the upload to the server 110 occurs almost immediately.

Further, the filter module 230 may be configured to provide a series of rules which determine which components of the appointment data 406/client data 410/service provider data 408 are transmitted as part of data package 404b. The following description provides some examples of filtering rules that may be used within the filtering module 230.

In one embodiment, once the bridge 104 has received the data package 404a, the upload module 234 uses the filter module 230 to remove any service providers (as defined in the service provider data 408) or clients (as defined in the client data 410) which are not referenced in the list of appointments provided by the appointment data 406. In this case, if there are service providers "Sn" or clients "Cn" which have no appointments "An" linked to them then there is no reason to upload the particular service provider data 408 or client data 410.

Additionally, the filter module 230 may be configured with filter settings which remove stale appointments which have expired, or unchanged appointments. In this case, if the appointment data 406/client data 410/service provider data 408 remains unchanged since previous transmissions then the appointment data 406/client data 410/service provider data 408 is not transmitted again to the server 110.

In another embodiment, if the client data 410 specifies that a client does not want reminders for their appointments (i.e. by setting a DoNotCall flag to indicate this) then the filter module 230 detects the value of the flag and removes the particular client data 410 and associated appointment data 406 from the data package 404b prior to transmission to the server 110.

In one embodiment, once the filtration process is completed via the filter module 234, a count of the number of total rows to upload to the server 110 is determined and the information is uploaded to the server 110 via the upload module 234 across the network 106. This count of number of rows is passed by the bridge 104 as a checksum value for the server 110 to perform error checking and verification of correct transmission. Further, in one embodiment, the upload module 234 may also transmit an account security token to the server 110 that may be defined in the configuration settings 232 and for substantially immediate verification by the server 110 prior to processing of the data package 404. Additionally, the upload module 234 may be configured to encrypt all communications including data package 404 via SSL prior to transmission to the server 110. Other forms of secure transmission of the data package 404 may be used as will be understood by a person of ordinary skill in the art.

Further, the server 110 may be configured to transmit acknowledgement of successful transmission of the data package 404. In this case, if the transmission of the data package 404a is successful, then the upload module 234 is further configured to update the last transmission date and time stored in the configuration settings 232 and the connection to the database 310 may then be closed. As discussed earlier, the last transmission date stored within the configuration settings 232 may be used by the bridge 104 to determine which appointment related data has not been communicated yet.

Alternatively, according to one embodiment, the bridge 104 further comprises a communication module 235. In this embodiment, the communication module 235 is configured to communicate with the server 110 and to provide the filtered data package 404b to the server 110. Similar to the operation described earlier, the upload module 234 is configured to receive the data package 404a from the database 210 via the scheduler 224. As described above, prior to this upload, the upload module 234 detects the communication protocols as defined in the configuration settings 232. Once the upload module 234 receives the data package 404a from the database 210, then the upload module 234 cooperates with the filter module 230 which removes unnecessary data from the data package 404a to generate the data package 404b. As described earlier, this unnecessary data can include for example, stale data, unchanged data, or data not required for generating the notification reminder 506. The data package 404b is then forwarded to the communication module 235 which is configured to communicate with the server 110 and transmit the data package 404b to the server 110 for subsequent generation of the notification reminders 506.

Download Module 236

As described earlier, the download module 236 of the bridge 104 facilitates downloading of responses (received in the form of the notification package 504) to notification reminders 506 generated at the server 110 and containing information about a particular appointment and corresponding client. Once the download module 236 processes the notification package 504, it applies the response (i.e. confirmation type, appointment related data) to the database 210 associated with scheduling device 102. Similar to the upload operation, the operation of the download module 236 is defined by the configuration settings 232.

The download module 236 is thus configured to receive client responses to automated appointment reminders for the client via the notification package 504 sent from the server 110. The client responses referred to as notification responses 507 can include for example, appointment confirmation and appointment activity information obtained from the client device 108. As will be described, the download module 236 is further configured to process the results received in the notification package 504 and update the database 210 accordingly. Similar to the upload operation, in the download operation of the download module 236, the local configuration settings 232a are synchronized with those of the server-defined configuration settings 232b. As well, based on the "DatabaseProvider" setting in the configuration settings 232, the download module 236 establishes a connection to the database 210.

Further, in one embodiment, the "StartInterval" and "EndInterval" stored in the configuration settings 232 are examined by the server 110 to determine the list of confirmed appointments to report back to the bridge 104 via the notification package 504. The range will be from the current date/time less the StartInterval in hours to the current date/time plus the StartInterval in hours. Thus, only appointments which have been confirmed (and related activity) are reported back to the bridge 104.

Referring again to FIG. 6, at step 628, the confirmed appointments and activity transmitted via the notification package 504 are then downloaded to the bridge 104 for further processing. The notification package 504 received includes, for example, the confirmation SQL and the client appointment id which was confirmed. Referring to FIG. 5, shown is an example notification package 504 which comprises one or more of appointment data 406 in native language; client data 410 in native language; service provider data 408 in native language; and notification responses 507 in native language.

At steps 630 and 632, the download module 236 iterates through all the appointments received in the notification package 504 and applies the confirmation SQL or other forms of notification responses contained therein to update the database 210. Further, the download module 236 is configured to iterates through all the client activity received in the notification package 504 and applies the activity SQL (or other native language) to update the database 210. The result is that the corresponding scheduling device 102 and the scheduling application/executable instructions 224 will then show the appointment as confirmed and display the reminder activity/response to the appointment notification on the user interface 202, if this feature is supported by the client application.

Figure 7:
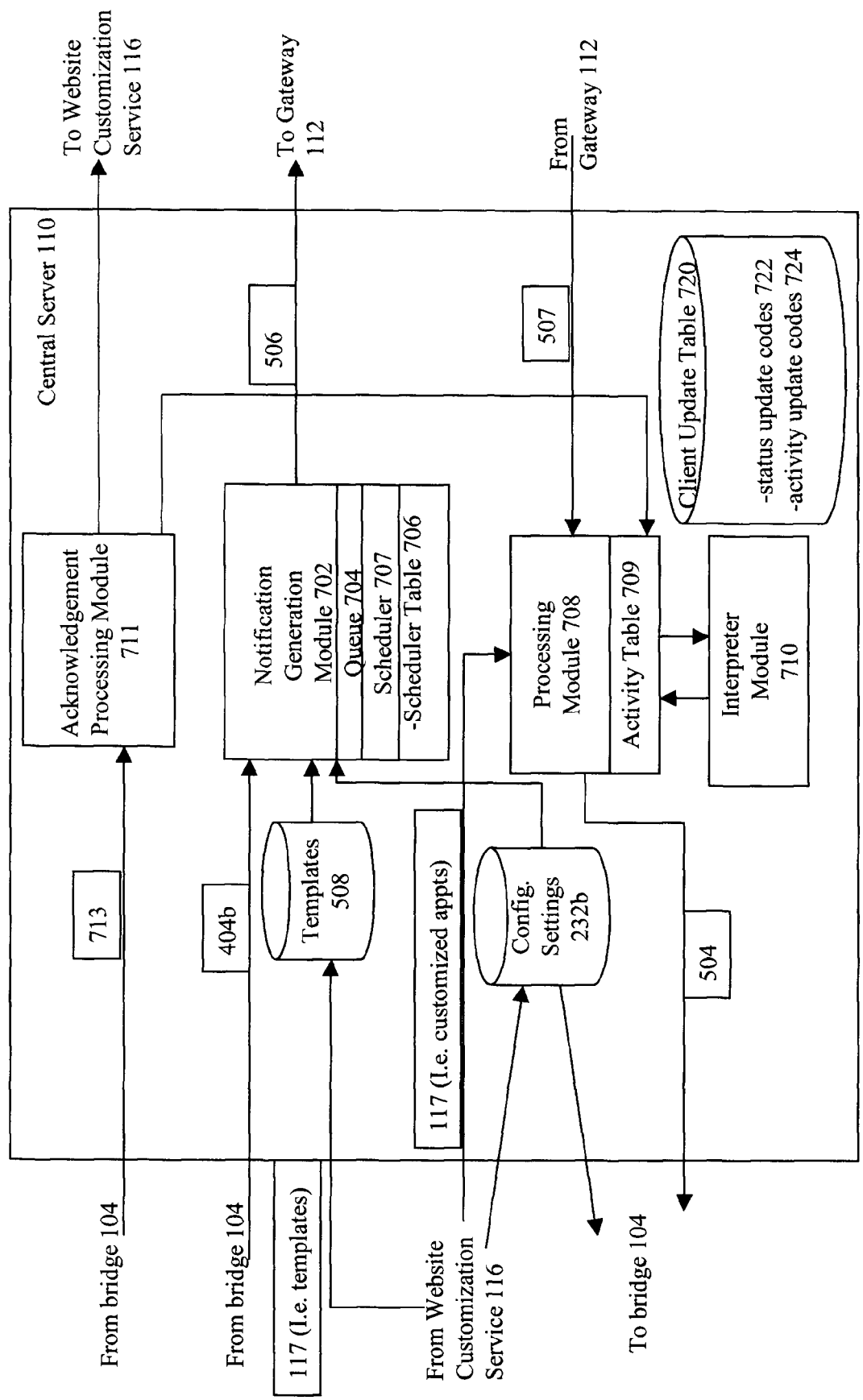
FIG. 7 is a block diagram illustrating the central server 110 of FIG. 1.

Further, after successful update of the appointment and activity information via the notification package 504 to the database 210, a confirmation (i.e. via an acknowledgement message 713) is sent to an acknowledgement processing module 711 of the server 110 at step 634 (i.e. via the communication module 235). As shown in FIG. 7, the acknowledgement processing module 711 then marks the confirmation notification package as applied within the activity table 709 of the server 110. For example, a list of all appointments (this can be in the form of appointment data 406) which were updated is sent back to the server 110 via the communication module 235. This allows the server 110 to update the configuration settings 232 (i.e. flag that the client is confirmed for the Appointment and ReminderAudit tables for the corresponding reminder).

In one embodiment, the upload module 234 of the bridge 104 is configured to communicate with the download module 236 prior to transmission of appointment related data via the data package 404 to the server 110. In this case, the download module 236 may have received a notification package 504 from the server 110 for processing which includes status updates (i.e. confirmation of a particular appointment for a corresponding client and service provider). The download module 236 may further comprise a queue of status of appointment related data for processing. The upload module 234 may also comprise a queue for processing of the appointment related data prior to transmission to the server 110. Thus the upload module 234 may check the queue or other storage means of the download module 236 to verify that the data package 404 has not yet been confirmed (or other reminder activity not yet received) via notification package 504. If the data package 404 contained in the queue of the bridge has been confirmed then the data package 404 is removed from the queue of the upload module 234 prior to transmission to the server 110.

Further, in one embodiment as shown in FIG. 3, if the bridge is implemented as a bridge proxy server 104b then the bridge proxy server 104b comprises a network connection interface 300, a user interface 302, coupled to the device infrastructure 304 by connection 318, 322 respectively. The device infrastructure 304 further comprises one or more computer processors 308 and can include an associated memory 310. Further, the device infrastructure 304 can include a computer readable storage medium 312 coupled to the processor 308. Further the bridge proxy server 104b comprises executable instructions 238, filter module 230, upload module 234, download module 236, and configuration settings 232a coupled to the device infrastructure via 320. It will be understood by a person of ordinary skill in the art, that components 300, 302, 304, 308, 310, 312, 318, 320 and 322 discussed in reference to FIG. 3 are similar components and devices as corresponding components 200, 202, 204, 208, 210, 212, 218, 220 and 222 discussed in reference to FIG. 2.

Figure 8:
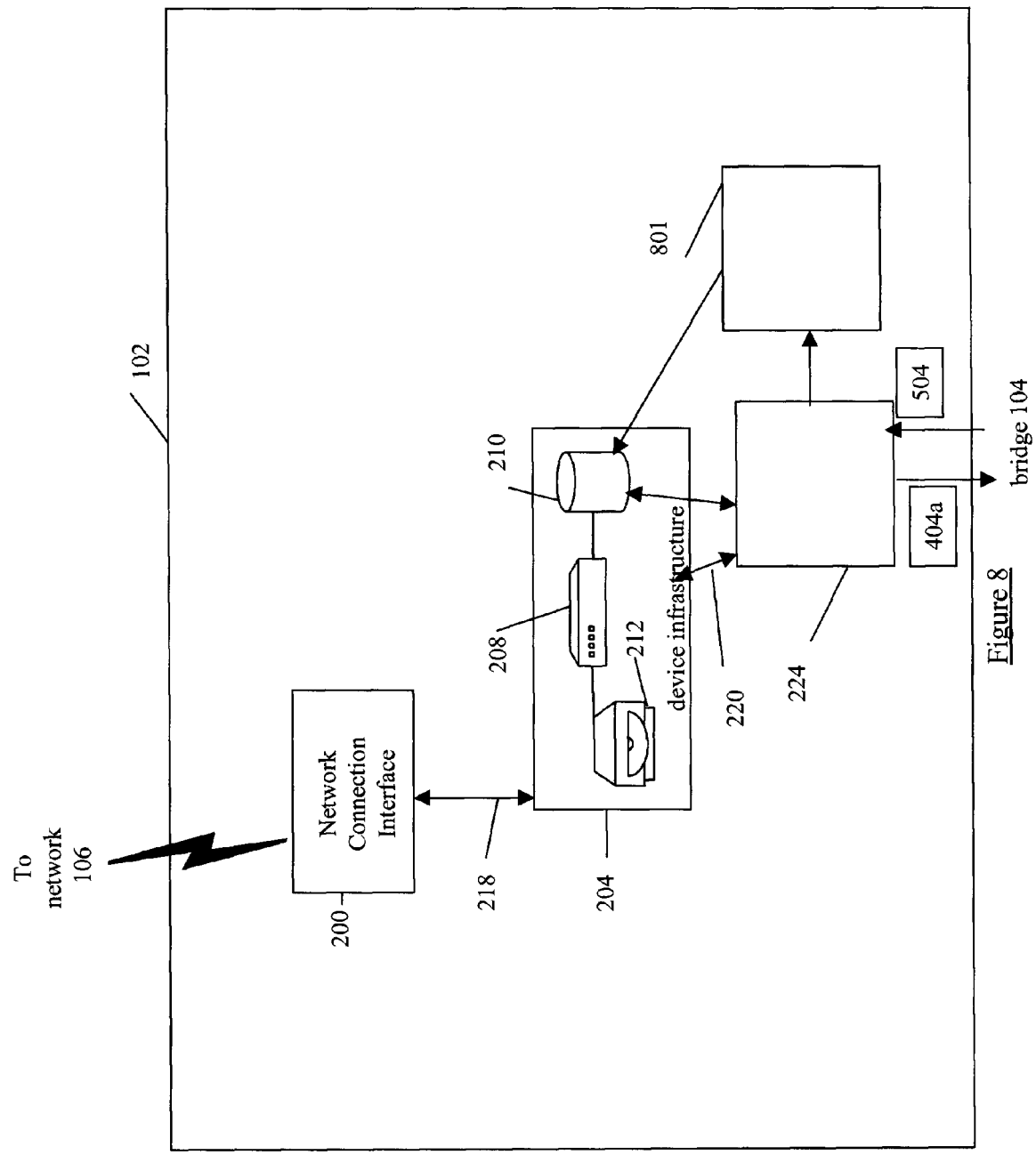
FIG. 8 is a block diagram illustrating the scheduling device of FIG. 1 according to an embodiment.

As described above, the bridge 104 is a generic bridge configured to communicate with different types of databases 210 and scheduler applications 224. The configuration settings 232a can predefine the type of database 210 and the scheduler application 224 used (as well as the required communication protocol) such that the bridge's upload module 234 and download module 236 are configured for communication to the scheduling device 102. As described above, the types of database connections may include ODBC", "OLEDB", ProxyTimeout among others as will be understood by a person skilled in the art. Referring now to FIG. 8, shown is a block diagram of the scheduling device 102 further comprising a database manager 801. In this embodiment, once the scheduler application 224 receives the notification package 504 from the bridge 104, the scheduler application 224 then passes the notification package 504 containing the response data (in the native language of database 210), to the database manager 801 for subsequent application of the response data in native language to the database 210. Alternatively, the bridge 104 may be configured to communicate directly with the database manager 801 and provide the notification package 504 for subsequent application to the database 210.

Creation of New Appointments/Updates Via the Website Customization Service 116

As described above, the website customization service 116 provides the interface for customizing the notification reminders 506 (i.e. via customization of the templates 508) and/or customization of the configuration settings 232 in the form of the website update package 117 adapted to be subsequently applied to the server 110 and/or the bridge 104. According to one embodiment, the website customization service 116 further provides an interface for a user to schedule new appointments and/or modify existing appointment information including deleting existing appointments (see FIG. 7).

For example, the website customization module 116 may be configured to provide a copy of the database 210 corresponding to a scheduling device 102 such that a user accessing the website customization service 116, is able to view the current status of one or more appointments for a corresponding service provider 408 associated with the scheduling device 102 and accordingly request a new appointment and/or change an existing appointment information. In this case, the new appointment and/or changes to existing appointment information are transmitted to the server 110 via the website update package 117. The update package 117 containing the updated appointment information is then received at the processing module 708 which encapsulates the update package 117 in the form of the notification package 504 and transmits the notification package 504 to the bridge 104.

Referring now to FIGS. 2 and 3, similar to the operation described above, once the download module 236 of the bridge 104 receives the notification package 504 comprising the requested new appointment/change of appointment information it applies the update to the corresponding database 210. Further, similar to the processing of reminder responses obtained via the notification package 504, the download module 236 is configured to generate a positive/negative confirmation about the application of the new appointment/modified appointment information received via update 117 to the database 210. For example, referring now to FIGS. 6 and 7, in the case where the download module 236 determines that the update can't be applied (i.e. the appointment time is no longer available, or the updated appointment information is not valid), the download module 236 generates a negative acknowledgement message 713 and communicates this to the communication module 235. In turn, the communication module 235 is configured to communicate the acknowledgement message 713 to the server 110. The acknowledgement processing module 711 then receives this acknowledgement message 713 and forwards it to the website customization service 116 for subsequent display to the user. Conversely, a positive acknowledgement message 713 is reflected on the website customization service 116 via the server 110. In this manner, a user can update/modify (e.g. delete)/add new appointment related information (i.e. modify a patient's contact information) via the website customization service 116 and the result is then verified to the user via the acknowledgement message 713 transmitted to the website customization service 116.

Central Server 110

Referring now to FIGS. 1 and 7, the central server 110 is configured to process the data package 404 containing appointment related data for particular clients and service providers and generate notification reminders 506 regarding said appointments to said clients. As shown in FIG. 7, the central server 110 further comprises a notification generation module 702 for processing the data package 404*b* and generating the notification reminders 506 in accordance with the processed data package 404*b*. The central server 110 further comprises customizable/predefined templates 508 for use by the notification generation module 702 in generating the text/voice to be used in the notification reminders 506 for the client's device 108. The voice or SMS or SMTP gateway 112 receives responses to the reminders 506 sent to the clients and forwards the notification responses 507 to the central server 110. The central server 110 further comprises a processing module 708. As described above, the processing module 708 may be configured to process update packages 117 (e.g. containing new appointments/modified appointment information). In addition, according to the present embodiment, the processing module 708 is configured to process responses to reminders (e.g. a confirmation of an appointment reminder received via notification responses 507). In this case, the processing module 708 processes the notification responses 507 received and generates the notification package 504 that is specific to the scheduling device database 210 using an interpreter module 710 coupled thereto. The notification package is subsequently transmitted to the bridge 104.

The operation of the central server 110 will be discussed with reference to each of the components in FIG. 7.

Notification Generation Module 702

In one embodiment, the notification generation module 702 first verifies the passed security token received from the bridge 104 against the value stored in the notification generation module 702. If the tokens match, then the central server 110 accepts receipt of the data package 404. The table below lists exemplary methods used to receive the data package 404*b* and perform processing thereon by the notification generation module 702:

| Stored Procedure | Purpose |
| --- | --- |
| sp_GetAccountInfo | Obtains account information for the account id passed. |
| usp_PA_GetNextBatchNumber | Obtains the next available batch number to be assigned during appointment import. |
| usp_PA_KillDeletedImportedAppts | Looks at all future appointments which have the IsImportedAppointment = 1 flag set. If the batch number for the appointment is not the latest batch number, the appointment is flagged as deleted and any reminders for the appointment are flagged as deleted. |
| usp_PA_ImportClient | Used to import client data into the server 110 |
| usp_PA_ImportServiceProvider | Used to import service provider data into the server 110 |
| usp_PA_ImportAppointment | Used to import appointment data into the server 110 |
| usp_PA_KillFutureDeletedAppts | Used to import an explicit list of future deleted appointments into the server 110 and marked as deleted (this procedure is used as an alternative to usp_PA_KillDeletedImportedAppts) |

Further details of exemplary steps performed by each of the above procedures is shown below:

Client Import

The stored procedure usp_PA_ImportClient is called. The following exemplary steps are executed:
 check to see if the Client already exist
 check to see if the Client has an existing Responsible Family Member set
 if no Responsible Family Member set, set the client themself as the Responsible Family Member
 add or update the Client setting the AccountId, Salutation, FirstName, LastName, EmailAddress, HomePhone, Cell
 verify phone/contact information to remove non-valid entries Client Table Trigger Functionality
 if the DoNotCallFlag is set for the client, kill all corresponding reminders Service Provider The stored procedure usp_PA_ImportServiceProvider is called. The following steps are executed:
 check to see if the Service Provider already exist
 add or update the Service Provider setting the AccountId, Salutation, FirstName, LastName, and ServiceProvider Appointment The stored procedure usp_PA_ImportAppointment is called. The following steps are executed:
 first finds the client id and service provider id for this appointment
 looks up the reminders for the account
 if one of the Notification type is a voice call for the appointment, look up and set to the preferred voice call time
 if no PreferredVoiceCallTime exists, set the VoiceCallTime to a predetermined time
 check to see if this is a SameDay appointment, set the corresponding flag
 checks to see if the appointment already exist
 if adding the Appointment, sets the ApptDate, LengthInMinutes, ClientId, AccountId, ServiceProviderId, Notification if updating the Appointment, sets the ApptDate, LengthIn-Minutes, ClientId, AccountId, ServiceProviderId, Notification Appointment Table Trigger Functionality

[tr_PA_UpdateApptDotNotCall]
if the appointment DoNotCall flag is set, kill all corresponding reminders

[usp_PA_trUpdateAppt]
if the ApptDate is changed, check to see if this is a Same-Day Appointment
if the appointment is a "SameDay" appointment then flag it as a SameDay Appointment
If the appointment is NOT a "SameDay" appointment then:
kill all the reminders which have not already been sent for this appointment
reset the reminder generated flag for the appointment
reset the IsClientConfirmed flag to set the appointment as not confirmed
flag the appointment as NOT being a SameDay appointment Preprocessing As shown in the procedures above, the notification generation module 702 performs pre-processing of the received data package 404 prior to generating the notification reminders 506. For example, in the case of back-to-back appointments, the notification generation module 702 identifies the client's first appointment in a day as the only appointment requiring communication. All notifications for later appointments in the same day are held (i.e. no new notification reminders 506 are generated) and inherit the confirmation status of the first appointment in the activity table 709. While importing the data package 404b from the bridge 104, the notification generation module 702 flags same-day appointments if they are created/modified within a pre-determined period prior to appointment notifications and they are assumed to be confirmed based on the small period of time between the booking and the actual appointment.

In another embodiment, the notification generation module 702 receives a data package 404 where the event data 406 applies to more than one persons (e.g. associated with more than one client 410). In this case, the notification generation module 702 flags the data package 404 so that more than one reminder is generated via the notification reminders 506, each generated notification reminder 506 being transmitted to the one or more persons associated with the event 406. For example, considering the scenario where a scheduled event such as a fire drill, or cancellation of school, or other occurrences which affect a number of clients then the data package 404 contains the event data 406, and the client data 410 includes identification of the number of clients associated with the event. In this case, several notification reminders 506 are generated by the notification generation module 702, each corresponding to the number of clients.

In another embodiment, the notification generation module 702 flags multiple appointments for the same family and groups them according to their contact phone number. If a number is due to be called multiple times for separate appointments, the notification reminders 506 are concatenated into one 'parent' call. Thus the appointments for concatenated notifications inherit the confirmation status of the 'parent' appointment in the activity table 709.

Exemplary implementations of the above embodiments are described below.

Back-to-Back Appointments: This method is passed the "OffsetHours" as a parameter. The logic loops through all appointments within OffsetHours hours of the current date/time and checks if there is another non-deleted appointment with the same client, account, year, month, day and later in the same day. If a later appointment exists which matches the same criterial, the task kills the reminders for the later appointment and sets the "B2BApptId" values to the current (parent) appointment. The result is that only one reminder will be sent to the client for the back to back appointments they have scheduled during the same day.

Same Day Appointment: Appointments booked or changed close to the actual date of the appointment are considered to be pre-confirmed by nature. When these types of appointments are transmitted across the bridge 104, they are classified as 'sameday' and no reminders are generated or sent out for this appointment. Each account has a value on the account table called "SameDayInternalHours" If the appointment is within SameDayInternalHours hours of the current date/time, the appointment is considered a SameDay appointment and flagged as such on the appointment table. No reminders are generated for "SameDay" appointments as they are presumed to be confirmed based on their proximity to the actual event.

Family Member Reminders: Family calling is the method in which it is determined whether to confirm all appointments for all family members in one call or separate calls. Enabled on a per account basis, the Family Calling scheduled task runs through all scheduled voice calls in the next few days. The number to call is examined for each reminder. If more than one reminder is due to be sent to the same phone number for appointments on the same day, the first appointment timewise is considered to be the 'Parent'. All reminders for appointments later in the day are killed. I.e—"I'm calling to remind Patient 1, Patient 2 AND Patient 3 of their. (Patient 1 is the parent appointment, the reminders for Patient 2 and Patient 3 were killed and their names added to the reminder for Patient 1).

The table below lists examples of cases where the notification generation module 702 determines upon processing the data package 404b that no notification reminders 506 should be generated for the data package 404b

| Killed Reminder Type ID Description |
| --- |
| Killed because a responsible family member had an appointment on the same day. |
| Killed because Client DoNotCall flag changed to 1 |
| Killed because no valid client email available |
| Killed because appt deleted in upload |
| Killed because it is not this first appointment of the day for this client |
| Killed because email bounced |
| Manual—Administrative |

Additionally, in one embodiment, notification reminders are not generated if, the configuration settings 232 provided to the notification generation module 702 provide the following settings for the account associated with the data package 404: a) DoNotGenerateReminders=1 for the Service Provider; b) DoNotCall=1 for the Client; c) Isdeleted=1 for the Appointment (appointment flagged as deleted); d) DoNotGenerateReminders=1 for the Account; e) IsSameDayAppt=1 for the appointment (same day appointment); 1) DoNotSendReminder=1 for the appointment; DoNotGeneratePastDue=1 for the Appointment. For example, if the DoNotGeneratePastDue flag is set, it will prevent a reminder for an appointment that has occurred in the past from being generated. In this case, if a reminder is being generated which should have been sent out a week before the reminder was generated, it will not be generated.

Scheduler Table 706

Referring to FIG. 7, the notification generation module 702 further comprises a scheduler 707 and a scheduler table 706 for determining when the notification reminders 506 should be transmitted to the client devices 108 in accordance with the account specific information (i.e. client/service provider/scheduling device 102 specific requirements) stored in the scheduler table 706. The scheduler table 706 may contain predefined or default values therein. However, the scheduler table 706 values may also be customizable via the website customization service 116. For example, a client/service provider may have specific predefined call times associated therewith for contact via email, SMS or voice calling. These call times may further be manipulated by the scheduler 707 to account for time zone changes and the scheduler 707 may also overwrite the call times defined in the scheduler table 706 based on the account specific statistics obtained in the activity table 709. That is, if the scheduler 707 determines, based on analyzing the success/failure information stored in the activity table 709 that a particular time slot has had success in reaching one or more clients, then the scheduler 707 may modify the scheduler table 706 to overwrite existing call times for the one or more clients with those times having a higher success rate.

Notification Text/Voice Generation

As described earlier, templates 508 are used to store a series of predefined and/or customizable text/voice templates which facilitate the generation of notification reminders 506 via the notification generation module 702. Once the notification generation module 702 receives the data package 404b and determines the time for sending out the notification reminder 506 for that data package 404b according to the scheduler 707 then the notification generation module 702 applies one or more of the templates 508 which are specific to the client/service provider associated with the data package 404b. For example, for e-mail and SMS messages, 15 minutes prior to the notification send time, the client details (name/appointment date time) provided in the data package 404 are merged with the message template 508 text for the account to generate the notification reminders 506.

In order to generate notification reminders 506 using voice reminders, a voice template 508 is used and merged with the appointment related data. The voice template 508 is account specific for the specific client and/or service provider.

The notification reminders 506 are then placed within the queue 704 for subsequent transmission to the client devices 108 in accordance with the times determined by the scheduler 707.

Processing Module 708

Once a particular notification response 507 is received at the processing module 708, the module 708 may further be configured to store the client activity and reminder responses in the activity table 709 for later access by the central server 110 and for tracking of status of notification responses 507. In one example, the activity table is further divided into other tables such as a reminder table for storing responses to text-based messages (e.g. email, SMS) as well as voice call audit tables for storing responses to voice-based notification reminders 506.

The interpreter module 710 coupled thereto is further configured to translate the notification responses 507 stored in the activity table 709 into the native language associated with the database 210 of the scheduling device 102. This translation of the notification response 507 in the native language of the database defines the format of the notification package 504 that is transmitted to the bridge 104. As will be described, the notification package 504 contains the status of appointment and/or the contact activity details relating to the interaction of the client in response to receiving the notification reminder 506.

For example, the interpreter module 710 accesses a client update table 720 which stores generic and/or account specific (e.g. defined by service provider/client information) SQL update statements that are in the native language of the scheduler database 210. The SQL update statements include statements for the various types of client confirmations/detected client activity related to an appointment. That is, the client update table 720 further comprises status update codes 722; and activity update codes 724. The status update codes 722 define the SQL statement for confirmation related activity, such as but not limited to: client confirmation of appointment; and client rejection of appointment information. The activity update codes 724 may define the SQL statements for other types of activity detected from the client, such as but not limited to: number busy, no answer, call hangup, answering machine-dropped call, delivered to answering machine; and call was answered by human but they didn't respond to prompts-reschedule call. As will be appreciated by a person skilled in the art, the status and activity update codes 722 and 724 may be combined so as to generate a single SQL statement based on the notification response 507.

The interpreter module 710 then converts the appointment related information and response contained in the notification response 507 to the appropriate SQL statements (via the update codes within the client update table 720) and forwards them to the processing module 708 for transmission to the bridge 104. This may be done by substituting the notification response 507 values stored in the activity table into the SQL templates defined by the status and/or activity update codes 722, 724 to define the notification package 504. In this manner, the notification package 504 contains SQL statements indicative of the response/activity received from the client in the native language of the database 210 such that once the notification package 504 is passed from the server 110 to the bridge 104 it can directly be applied to the database 210 of the scheduling device 102.

Alternatively, the interpreter module 710 examines the notification response 507 stored in the activity table, retrieves the corresponding status and/or activity update codes 722, 724 and provides the combination of the SQL template provided in the form of codes 722, 724 and the notification response 507 to the bridge 104. The bridge 104 then substitutes the values provided by the notification response 507 into the corresponding codes 722, 724 and applies the updated SQL statement to the appropriate corresponding scheduling device database 210. Examples of this operation are further discussed below.

Exemplary Operation of System 100

The following description provides an exemplary operation of the system 100. For example, when a clinic signs up to use the information processing system 100, the following steps occur:

The account is setup within the system 100 by providing the account with a number, a security token which is used to secure information as well as an identifier indicating the type of client package (e.g. local bridge 104a and/or database 210 on the client's scheduling device 102) that the client is running. This will allows the system 100 (e.g. the server 110) to determine the appropriate SQL template to use to retrieve and update client information.

The account is configured for a set of reminders and a call template (e.g. notification reminders 506 generated using template 508). The reminder metadata indicates what reminders should be generated for appointments for the account and at what interval prior to the appointment the reminder should be send. Possible reminder types include but are not limited to are email, SMS (Text Message to Cellular Phone), voice call, fax or Instant Message.

The bridge (e.g. bridge 104) is installed on one of the PC's (e.g. scheduling device) in the account's office. The bridge transmits appointment, service provider and client information (e.g. via data package 404 transmitting service provider data 408, appointment data 406, client data 410) to the server 110 to enable the server 110 to send reminders to account clients. The bridge also updates the account package database (e.g. database 210) with confirmation and activity information based on reminder activity within the server 110.

Workflow

The workflow for a patient appointment is as follows:

An appointment is created for a client. The appointment can be created in the system (e.g. scheduling device 102) through a variety of means including entered by a client at the account office, calling the receptionist at the account office or electronically via an external appointment scheduling facility. The client provides their relevant contact information including e-mail address, cell phone and phone contact information (e.g. client data 410). If any of the information is not available, the client reminder for this type of notification will not be sent and an audit log entry (e.g. activity table 709) in the server 110 will be generated to explain why the reminder was not sent.

The bridge (e.g. 104) connects to the client package (e.g. scheduling device 102) and extracts a list of all appointments, clients and service providers. The system then determines what clients and service providers are required to send based on the appointment list and filters (e.g. via filter module 230) the client and service provider list to exclude clients and service providers who do not need to be sent to the server 110. The list of filtered information might include appointments which are no longer active or appointments which do not require confirming.

The list of appointments and filtered list of service providers and clients (e.g. via data package 404b) are uploaded to the server 110. Newly created appointments are included in this list. The appointment, client and service provider information is applied to the server 110. In each case, if the appointment, client or service provider does not exist, they are added to the system. If the entity already exists, the information is updated.

Reminder Processing

There are automated tasks which run at scheduled intervals on the server 110. These tasks perform many functions including generating and sending the reminders associated with appointments. The schedule for the reminders is based on the account settings (e.g. as defined within the scheduler table 706) as noted in the "Appointment Booking" section above. A sample schedule could be:

| Reminder Type | Time to send out before appointment |
| --- | --- |
| Email Message | 7 days 30 minutes prior to appointment |
| Voice Call | 2 days prior to appointment |
| SMS Message | 90 minutes prior to appointment |

In this case, the appointment would generate 4 reminders (e.g. notification reminders 506) with each reminder being sent out at the specified interval before the appointment. For SMS and email messages, the body of the message is defined in a template (e.g. templates 508). The template is the generic version of the message without any appointment specifics. An example of this generic template is:

"Hi, This is a courtesy reminder of your approaching appointment. You have an appointment with <serviceprovidername> on <date> scheduled for <time>. We are looking forward to seeing you then. If you are unable to make this appointment, please call the office at <accountbusinessphone>, to reschedule. Thank you! <serviceprovidername>'s office."

Minutes before the message is due to be sent out, the generic message body template is merged with the appointment specific information to create the final message text. If a client has not provided accurate contact information (e.g. An email address for email reminders, a cellular phone number for SMS reminders or a valid phone number for voice calls), the reminder will not be sent and a note will be added to the audit logs (e.g. activity table 709) to indicate that the reminder was "killed" and the reason why.

Using the above sample schedule; the email message (e.g. via notification reminder 506) is sent 7 days before the appointment. For email reminders, the email text contains two hyperlinks at the bottom of the message. The first link allows the client to add this appointment to their local calendar application. The second link allows the client to connect back to the server 110 and acknowledge receipt of the reminder e-mail (e.g. via notification response 507). The body of the message is based on template text as earlier described.

The voice call (e.g. via notification reminder 506) is sent out 2 days prior to appointment. The voice calling system is capable of handling all possible outcomes from the voice call—i.e. no answer, busy signal, no response from client, answered by an answering machine etc. Regardless of the outcome, the result is recorded and later applied to the office scheduling package (e.g. database 210). Based on the outcome of the call, the server 110 determines whether the voice call result was sufficient to consider sending of this reminder completed or if another call needs to be sent out later. For example, if a client confirms the appointment, the voice calling should be considered completed for this reminder. Conversely, if there is no answer or the client requests a callback at a later time, the voice call is rescheduled into the future. The ultimate determination of a calls success and corresponding actions are specific to each account. As illustration of this point, accounts may request that an answering machine be considered the final result while other accounts request that this result type be re-attempted later in hopes of attaining a human recipient.

For SMS reminders, the client can reply to the SMS message to indicate a response such as "I will be there". This response is received by the server 110 and forwarded to the account office (e.g. scheduling device 102).

When a reminder is sent the specific information about this reminder (e.g. notification response 507) is written to the ReminderAudit table (e.g. Activity Table 709). This table is used to determine whether appointments have been confirmed and to report on client activity.

Updates to ReminderAuditTable (e.g. Activity Table 709)

Email Reminders: when an email is successfully sent, a row is written to the ReminderAudit table (e.g. Activity Table 709). The row indicates the resultcode="E1" and the HasBeenSent code as "1", indicating that the reminder was successfully sent.

SMS Reminders: when an SMS message is successfully sent, a row is written to the ReminderAudit table. The row indicates the resultcode="S1" and the HasBeenSent code as "1", indicating that the reminder was successfully sent.

Voice Calls: all voice calls are scheduled based on a timetable per account (e.g. Scheduler Table 706). The timetable is made up of a sequence of calling times in which a reminder is called. An example of this timetable could be:

| ID | AccountID | Call Time |
|---|---|---|
| 1 | 2 | 09:00:00.000 |
| 2 | 2 | 12:00:00.000 |
| 3 | 2 | 15:00:00.000 |
| 4 | 2 | 18:00:00.000 |
| 5 | 2 | 19:15:00.000 |
| 6 | 2 | 20:30:00.000 |

Using the above example, calls for this account (e.g. id 2) would go out starting at 9 am in their local time zone. If this call was unsuccessful or had no answer, the next call would go out at noon and so on throughout the day until either the maximum number of attempts or maximum number of contacts was exceeded (as will be discussed later).

When a voice call is sent, the voice call executes a calling script (e.g. using template 508) which calls the client on their voice contact number and solicits a response. All possible outcomes are anticipated and assigned a 'result code' within the call script. Each outcome is returned to the server 110 as a result code. Possible result codes include but are not limited to:

| Result Code | Description |
|---|---|
| V0 | Confirmed via Human Response |
| V1 | Successful Contact—Voice Message sent to office |
| V10 | Number busy |
| V11 | No Answer |
| V14 | Call hangup |
| V17 | No Answer |
| V19 | Confirmed by Family Member |
| V20 | Answering Machine—Dropped call |
| V3 | Call Answered—User requested to be called back later |
| V4 | Delivered to Answering Machine |
| V5 | Call was answered by human yet they did not respond to prompts. Reschedule Call |
| V6 | Not Confirmed—Fax Machine |
| V7 | Not Confirmed—Computer Answered |
| V9 | Not Confirmed—Call number unreachable |

When the call result is returned to server 110, the call result is logged to the VoiceCallAudit table (e.g. Activity Table 709) which logs all voice call results. The system next looks up the result code to determine which of the following attributes should be applied to the call. These attributes are specific to each result code and determine how the call should be handled.

IsSuccess—Was the call successfully placed?
FlagReminderSent—Does the reminder require another call?
ResendReminder—Should this reminder be re-sent at a later date?
ResendMinutes—If the call should be resent, in how many minutes?
SetClientPrefTime—Was this call confirmed via human? If so record the call details
IsAttempt—should this call be considered an attempt (see below)
IsClientContact—did this call make contact with a human
ClientUpdateCode—the link to the ClientUpdateConfig table If the voice call is considered an attempt (IsAttempt=1), the voice call is added to the ReminderAudit table. Examples of when a call is not an attempt include processing issues, all circuits busy etc. If another calls needs to be placed, the next time to calls is determined based on the account specific calling schedule. The server 110 maintains a minimum and maximum daily call time per account (e.g. as defined by Scheduler Table 706). If the next call time is past the latest daily call time for the account, the next voice call time is set to the first available call time for the next day.

The server 110 keeps track of number of attempts and maximum voice contacts per account client. If the number of voice contacts for this appointment exceeds the maximum voice contacts per account client, the MaxContactsExceeded flag is set for this reminder in the reminderaudit table (e.g. Activity Table 709) and no further calls will be placed for this reminder.

Updates to the Account Package Database (e.g. Database 210)

The ClientUpdateConfig table (e.g. Client Update Table 720) stores information based on the account and the ClientUpdateCode from the ResultCode table. The ClientUpdateConfig table (e.g. Client Update Table 720) contains two pieces of information: should the call be considered a confirmation of the appointment and the SQL template ("ConfirmSQL") (e.g. status update codes 722 and/or activity update codes 724) needed to update the account package (e.g. database 210) with this call activity. The bridge (e.g. 104) sends this call activity to the account package (e.g. database 210) by substituting the call values into the SQL template and applying the SQL to the account package database (e.g. database 210). The bridge 104 then applies the appropriate update SQL statements to the local database. Thus, in this case, the server 110 provides the generic SQL statement and values for populating the SQL statement (as defined by the reminder notification responses 507 stored in the activity table 709) to the bridge 104. The bridge 104 then combines the SQL statement and values for applying to the corresponding database 210.

Alternatively, once a response to a generated reminder is received (i.e. a status update or an activity received via notification response 507) and stored within the activity table 709, the interpreter module 710 applies the SQL templates contained within the Client Update Table 720 to the received reminder response (e.g. as stored in the activity table 709) and thereby generates a corresponding SQL statement containing the reminder response as provided to the bridge 104 via the notification package 504. In this case, the bridge 104 applies the notification package 504 containing the update SQL statement directly to the database 210.

In both cases described above, appointment activity and appointment state information (ie. Confirmed, Message left) are applied to the account package database (e.g. database 210).

Thus, the next time the appointment information is synched into the server 110, the confirmation flag stored in the account package (e.g. database 210) is also recorded (e.g. via acknowledgement processing module 711 uploads the confirmation flag and updates the activity table 709) to ensure that the confirmation values between the two systems are kept in sync. In this way if the client manually confirms an appointment within the office (e.g. via the scheduling device 102) of the account by calling in directly, the confirmation flag for the appointment will be set in both systems, preventing the appointment from being confirmed twice.

Updating Client Activity to the Account Package (e.g. Scheduling Device 102)

For each action performed in response to a reminder, activity details are recorded in the account scheduling package (e.g. database 210 of scheduling device 102). The details of how to update an account scheduling package are specific to each account and are stored in a table (e.g. as defined by client update table 720). Every reminder outcome has a link to a corresponding, account specific update string (e.g. status update codes 722 and/or activity update codes 724) which is applied to update the scheduling package. For example, if a voice reminder is confirmed, the package update language would be responsible for updating the status of the appointment as well as entering the details of how it was confirmed (e.g. defining details of the communication interaction with the client upon providing the notification reminder to the client) in the appointment communication log (e.g. database 210). Specifically, as an example, the following code could be used to confirm the appointment and provide a status update: UPDATE APPOINTMENT SET APPOINTMENT CONFIRMED='21' WHERE APTNUM='$AppointmentId'

Thus, values for variables prefixed with $Variable (i.e. $AppointmentId) represent the identifier used by the local scheduling database (e.g. database 210) to refer to the appointment identifier we are confirming. For example, the appointment identifier may include '23456' which identifies the particular appointment within the service provider's list of appointments.

Followed by the following SQL which defines the activity related to the notification response 507:
INSERT INTO COMMLOG (PATNUM, COMMDATETIME, COMMTYPE, NOTE, MODE, SENTORRECEIVED, EMAILMESSAGENUM) VALUES ('$ClientId', STR_TO_DATE('$SentDateTime', '% m/% d/% Y % I:% i:% s % p'), '2', 'PromptAlert—Confirmed via Human Response', '3','1','0')

Once all $Variables are replaced with the corresponding identifiers for the local scheduling package, the SQL is applied to the account database by the bridge 104. For example, in the case above, the ClientId may be replaced with '9876'; and the SentDateTime may be replaced with '2007-01-01-12:30:00.000'.

As will be appreciated by a person skilled in the art, by populating the local database (e.g database 210) for each account enables office personnel to query the local scheduling package to determine if daily appointments have been confirmed and to respond to patient inquiries regarding communication to the client by the system 100 on behalf of the office.

Accordingly, although preferred embodiments of the invention have been described herein, it will be understood by those skilled in the art that variations may be made thereto without departing from the spirit of the invention or the scope of the appended claims.

What is claimed is:

1. A system for updating stored event data of a scheduling device, the event data adaptable for use in generating an event reminder message for receipt by a client resulting in corresponding response data in response to the event reminder message, the system comprising:
a bridge device including a memory and a processor, the memory including instructions executable in the processor to provide:
an upload module configured for receiving a data package including the event data and at least one of a client data and service provider data associated therewith;
a filter module configured for removing unnecessary data from the data package in accordance with predetermined filter settings to provide a modified data package;
a communication module for configuring the modified data package for transmission to a server device for use in generating the event reminder message; and
a download module configured for receiving a notification package including the response data translated into a database native language format of the scheduling device suitable for updating the stored event data;
wherein the notification package is sent to the scheduling device for updating of the corresponding event data.

2. The system according to claim 1, wherein the filter settings cooperate with the filter module to remove at least one of stale data, unchanged data compared to prior transmission of the data to the communication module, client data not linked to event data, and service provider data not linked to the event data.

3. The system according to claim 2, wherein the event data is selected from the group comprising: event id, event date, event time, event length, corresponding client id, corresponding service provider id, and type id.

4. The system according to claim 3, wherein the client data is selected from the group comprising: client id, client name, contact phone number, e-mail address, responsible family member, donotcall setting, last updated information, account id, client date of birth, client contact information, and client billing details.

5. The system according to claim 4, wherein the service provider data is selected from the group comprising: service provider id, service provider name, and the account id.

6. The system according to claim 1, wherein the response data translated into the native language comprises SQL update statements for updating the event data.

7. The system of claim 1 further comprising a website customization user interface communicatively accessible via the scheduling device, the website customization user interface for scheduling new appointments and modifying appointment information.

8. A system adapted to update stored event data of a scheduling device, the event data adapted for use in generating an event reminder message for receipt by a client resulting in corresponding response data in response to the event reminder message, the system comprising:
a bridge device including a memory and a processor, the memory including instructions executable in the processor to provide:
an upload module configured for receiving a data package including the event data and at least one of a client data and service provider data associated therewith, the event data selected from the group consisting of event id, event date, event time, event length, corresponding client id, corresponding service provider id, and type id, the client data selected from the group consisting of client id, client name, contact phone number e-mail address, responsible family member, donotcall setting, last updated information, account id, client date of birth, client contact information, and client billing details, and the service provider data selected from the group consisting of service provider id, service provider name, and the account id;
a filter module configured for removing unnecessary data from the data package in accordance with predetermined filter settings to provide a modified data package, the filter settings cooperating with the filter module to remove at least one of stale data, unchanged data compared to prior transmission of the data to the communication module, client data not linked to event data, and service provider data not linked to the event data, the filter module further configured to filter event data and corresponding client data in accordance with the do-not-call settings associated with each client data;

a communication module for configuring the modified data package for transmission to a server device for use in generating the event reminder message; and a download module configured for receiving a notification package including the response data translated into a database native language format of the scheduling device suitable for updating the stored event data;

wherein the notification package is sent to the scheduling device for updating of the corresponding event data.

9. The system according to claim 8, wherein the notification package further comprises at least one of new event data, modified event data, new client data and modified client data.

10. The system according to claim 9, wherein the download module is further configured to apply said at least one of new event data, modified event data, or modified client data to accordingly update at least one of said event data, and client data of a database associated with the scheduling device, the notification package in the native language of the database.

11. The system according to claim 10, wherein the download module is further configured to communicate to the communication module a confirmation for the updating at least one of the event data and the client data on the scheduling device, the communication module further configured for communicating the update to the server.

12. The system according to claim 8, wherein the upload module is configured to communicate with one or more different types of storages simultaneously, each storage being associated with one of the scheduling devices for storing the event data.

13. The system according to claim 12, wherein the download module is configured to communicate with different types of storages simultaneously, each storage being associated with one of the scheduling devices for storing the event data.

14. The system according to claim 13, further comprising customizable and predetermined configuration settings for defining time intervals for communication of the upload module, the communication module and the download module with respect to the scheduling device and the server.

15. The system according to claim 14, wherein the configuration settings further define a communication protocol for use by the upload module and the download module to communicate with the scheduling device and its associated storage.

16. The system according to claim 15, wherein the upload module is configured to receive segments of the data package at each upload transmission and to link segments of the data package received at different time intervals.

17. The system according to claim 15, wherein the communication module is further configured to communicate with the download module prior to transmission of the event data such that the transmission of the event data is cancelled if the download module has received response data corresponding to the event data.

18. The system according to claim 17, wherein the download module is further configured to communicate to the communication module a confirmation for the updating of the event data on the scheduling device, the communication module further configured for communicating the update to the server.

19. The system according to claim 18, wherein the upload module, the download module, the filter module and the communication module is configured as a bridge application for local installation on the scheduling device.

20. The system according to claim 18, wherein the upload module, the download module, the filter module and the communication module is configured as a bridge proxy server coupled to the scheduling device.

21. The system of claim 8 further comprising a website customization user interface communicatively accessible via the scheduling device, the website customization user interface for scheduling new appointments and modifying appointment information.

22. A system adapted to track and update for event data received from a scheduling device, the system comprising:

a bridge device including a memory and processor, the memory including instructions executable in the processor and being configured to receive a data package comprising the event data and at least one of a client data and service provider data associated therewith, the bridge, device further configured for removing stale data from the data package in accordance with predetermined filter settings; and a server device configured to receive the filtered data package forwarded from the bridge device and to generate reminders for the client associated with the data package, the server device further configured to forward a notification package having a notification response from the client to the bridge device;

wherein the bridge device is further configured to cooperate with the scheduling device to apply the notification response thereon.

23. A method for facilitating updating of stored event data of a scheduling device, the event data adaptable for use in generating an event reminder message for receipt by a client resulting in corresponding response data in response to the event reminder message, the method comprising:

receiving a data package at a bridge device including the event data and at least one of a client data and service provider data associated therewith;

removing unnecessary data from the data package in accordance with predetermined filter settings to provide a modified data package at the bridge device;

transmitting, from the bridge device, the modified data package to a server device for use in generating the event reminder message; and receiving, at the bridge device, a notification package including the response data translated into a native language format of the scheduling device suitable for updating the stored event data, wherein the notification package is subsequently sent to the scheduling device for updating of the corresponding event data.

24. The method according to claim 23 further comprising the step of customizing predetermined configuration settings for defining time intervals for communication of the modified data package to the server.

25. The method according to claim 23 further comprising the step of filtering according to the filter settings to remove at least one of stale data, unchanged data compared to prior transmission of the data to the communication module, client data not linked to event data, and service provider data not linked to the event data.

* * * * *